(12) United States Patent
Raichelgauz et al.

(10) Patent No.: US 11,216,498 B2
(45) Date of Patent: Jan. 4, 2022

(54) SYSTEM AND METHOD FOR GENERATING SIGNATURES TO THREE-DIMENSIONAL MULTIMEDIA DATA ELEMENTS

(71) Applicant: Cortica, Ltd., Tel Aviv (IL)

(72) Inventors: Igal Raichelgauz, Tel Aviv (IL); Karina Odinaev, Tel Aviv (IL); Yehoshua Y. Zeevi, Haifa (IL)

(73) Assignee: CORTICA, LTD., Tel Aviv (IL)

( * ) Notice: Subject to any disclaimer, the term of this patent is extended or adjusted under 35 U.S.C. 154(b) by 1225 days.

(21) Appl. No.: 14/621,643

(22) Filed: Feb. 13, 2015

(65) Prior Publication Data
US 2015/0161243 A1 Jun. 11, 2015

Related U.S. Application Data

(60) Provisional application No. 61/939,287, filed on Feb. 13, 2014.

(51) Int. Cl.
*G06F 15/16* (2006.01)
*G06F 16/33* (2019.01)
(Continued)

(52) U.S. Cl.
CPC ............ *G06F 16/334* (2019.01); *G06F 16/13* (2019.01); *G06F 16/24* (2019.01); *G06F 16/41* (2019.01);
(Continued)

(58) Field of Classification Search
None
See application file for complete search history.

(56) References Cited

U.S. PATENT DOCUMENTS

| | | |
|---|---|---|
| 4,733,353 A | 3/1988 | Jaswa |
| 4,932,645 A | 6/1990 | Schorey et al. |

(Continued)

FOREIGN PATENT DOCUMENTS

| | | |
|---|---|---|
| EP | 1085464 A3 | 1/2007 |
| WO | 0231764 | 4/2002 |

(Continued)

OTHER PUBLICATIONS

Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.

(Continued)

*Primary Examiner* — Alex Gofman
(74) *Attorney, Agent, or Firm* — Reches Patents

(57) ABSTRACT

A method and system for generating signatures for three-dimensional multimedia data elements. The method comprises receiving by a three-dimensional multimedia data element; projecting the received three-dimensional multimedia data element on at least one two-dimensional plane, wherein the projection results in two-dimensional graphic representations of the received three-dimensional multimedia data element; generating by a signature generator at least one signature for each of the plurality of two-dimensional graphic representations; assembling by an assembler unit the plurality of signatures generated for each of the plurality of two-dimensional graphic representations to generate a complex signature, wherein the complex signature is the signature representing the three-dimensional multimedia data element; and storing the signatures of each of the two-dimensional graphic representations of the at least one three-dimensional multimedia data element and the complex (Continued)

signature in association with the three-dimensional multimedia data element in a storage unit.

35 Claims, 7 Drawing Sheets

(51) Int. Cl.
  *G06F 16/13* (2019.01)
  *G06F 16/24* (2019.01)
  *G06F 16/41* (2019.01)
(52) U.S. Cl.
  CPC .... *Y10S 707/913* (2013.01); *Y10S 707/99943* (2013.01); *Y10S 707/99948* (2013.01)

(56) References Cited

U.S. PATENT DOCUMENTS

| | | | |
|---|---|---|---|
| 4,972,363 A | 11/1990 | Nguyen et al. | |
| 5,214,746 A | 5/1993 | Fogel et al. | |
| 5,307,451 A | 4/1994 | Clark | |
| 5,412,564 A | 5/1995 | Ecer | |
| 5,436,653 A | 7/1995 | Ellis et al. | |
| 5,568,181 A | 10/1996 | Greenwood et al. | |
| 5,638,425 A | 6/1997 | Meador et al. | |
| 5,745,678 A | 4/1998 | Herzberg et al. | |
| 5,763,069 A | 6/1998 | Jordan | |
| 5,806,061 A | 9/1998 | Chaudhuri et al. | |
| 5,835,901 A | 11/1998 | Duvoisin et al. | |
| 5,852,435 A | 12/1998 | Vigneaux et al. | |
| 5,870,754 A | 2/1999 | Dimitrova et al. | |
| 5,873,080 A | 2/1999 | Coden et al. | |
| 5,887,193 A | 3/1999 | Takahashi et al. | |
| 5,940,821 A | 8/1999 | Wical | |
| 5,978,754 A | 11/1999 | Kumano | |
| 5,987,454 A | 11/1999 | Hobbs | |
| 5,991,306 A | 11/1999 | Burns et al. | |
| 6,038,560 A | 3/2000 | Wical | |
| 6,052,481 A | 4/2000 | Grajski et al. | |
| 6,070,167 A | 5/2000 | Qian et al. | |
| 6,076,088 A | 6/2000 | Paik et al. | |
| 6,122,628 A | 9/2000 | Castelli et al. | |
| 6,128,651 A | 10/2000 | Cezar | |
| 6,137,911 A | 10/2000 | Zhilyaev | |
| 6,144,767 A | 11/2000 | Bottou et al. | |
| 6,147,636 A | 11/2000 | Gershenson | |
| 6,163,510 A | 12/2000 | Lee et al. | |
| 6,240,423 B1 | 5/2001 | Hirata | |
| 6,243,375 B1 | 6/2001 | Speicher | |
| 6,243,713 B1 | 6/2001 | Nelson et al. | |
| 6,269,307 B1 | 7/2001 | Shinmura | |
| 6,275,599 B1 | 8/2001 | Adler et al. | |
| 6,329,986 B1 | 12/2001 | Cheng | |
| 6,363,373 B1 | 3/2002 | Steinkraus | |
| 6,381,656 B1 | 4/2002 | Shankman | |
| 6,411,229 B2 | 6/2002 | Kobayashi | |
| 6,422,617 B1 | 7/2002 | Fukumoto et al. | |
| 6,493,692 B1 | 12/2002 | Kobayashi et al. | |
| 6,493,705 B1 | 12/2002 | Kobayashi et al. | |
| 6,507,672 B1 | 1/2003 | Watkins et al. | |
| 6,523,022 B1 | 2/2003 | Hobbs | |
| 6,523,046 B2 | 2/2003 | Liu et al. | |
| 6,524,861 B1 | 2/2003 | Anderson | |
| 6,526,400 B1 | 2/2003 | Takata et al. | |
| 6,550,018 B1 | 4/2003 | Abonamah et al. | |
| 6,557,042 B1 | 4/2003 | He et al. | |
| 6,560,597 B1 | 5/2003 | Dhillon et al. | |
| 6,594,699 B1 | 7/2003 | Sahai et al. | |
| 6,601,026 B2 | 7/2003 | Appelt et al. | |
| 6,601,060 B1 | 7/2003 | Tomaru | |
| 6,611,628 B1 | 8/2003 | Sekiguchi et al. | |
| 6,611,837 B2 | 8/2003 | Schreiber | |
| 6,618,711 B1 | 9/2003 | Ananth | |
| 6,640,015 B1 | 10/2003 | Lafruit | |
| 6,643,620 B1 | 11/2003 | Contolini et al. | |
| 6,643,643 B1 | 11/2003 | Lee et al. | |
| 6,665,657 B1 | 12/2003 | Dibachi | |
| 6,675,159 B1 | 1/2004 | Lin et al. | |
| 6,681,032 B2 | 1/2004 | Bortolussi et al. | |
| 6,704,725 B1 | 3/2004 | Lee | |
| 6,710,822 B1 * | 3/2004 | Walker | G06F 16/785 348/722 |
| 6,728,706 B2 | 4/2004 | Aggarwal et al. | |
| 6,732,149 B1 | 5/2004 | Kephart | |
| 6,742,094 B2 | 5/2004 | Igari | |
| 6,751,363 B1 | 6/2004 | Natsev et al. | |
| 6,751,613 B1 | 6/2004 | Lee et al. | |
| 6,754,435 B2 | 6/2004 | Kim | |
| 6,763,069 B1 | 7/2004 | Divakaran et al. | |
| 6,763,519 B1 | 7/2004 | McColl et al. | |
| 6,774,917 B1 | 8/2004 | Foote et al. | |
| 6,795,818 B1 | 9/2004 | Lee | |
| 6,804,356 B1 | 10/2004 | Krishnamachari | |
| 6,813,395 B1 | 11/2004 | Kinjo | |
| 6,819,797 B1 | 11/2004 | Smith et al. | |
| 6,836,776 B2 | 12/2004 | Schreiber | |
| 6,845,374 B1 | 1/2005 | Oliver et al. | |
| 6,877,134 B1 | 4/2005 | Fuller et al. | |
| 6,901,207 B1 | 5/2005 | Watkins | |
| 6,938,025 B1 | 8/2005 | Lulich et al. | |
| 6,963,975 B1 | 11/2005 | Weare | |
| 6,970,881 B1 | 11/2005 | Mohan et al. | |
| 6,978,264 B2 | 12/2005 | Chandrasekar et al. | |
| 6,985,172 B1 | 1/2006 | Rigney et al. | |
| 7,006,689 B2 | 2/2006 | Kasutani | |
| 7,013,051 B2 | 3/2006 | Sekiguchi et al. | |
| 7,020,654 B1 | 3/2006 | Najmi | |
| 7,023,979 B1 | 4/2006 | Wu et al. | |
| 7,043,473 B1 | 5/2006 | Rassool et al. | |
| 7,047,033 B2 | 5/2006 | Wyler | |
| 7,124,149 B2 | 10/2006 | Smith et al. | |
| 7,158,681 B2 | 1/2007 | Persiantsev | |
| 7,199,798 B1 | 4/2007 | Echigo et al. | |
| 7,215,828 B2 | 5/2007 | Luo | |
| 7,260,564 B1 | 8/2007 | Lynn et al. | |
| 7,277,928 B2 | 10/2007 | Lennon | |
| 7,296,012 B2 | 11/2007 | Ohashi | |
| 7,299,261 B1 | 11/2007 | Oliver et al. | |
| 7,302,117 B2 | 11/2007 | Sekiguchi et al. | |
| 7,313,805 B1 | 12/2007 | Rosin et al. | |
| 7,340,358 B2 | 3/2008 | Yoneyama | |
| 7,340,458 B2 | 3/2008 | Vaithilingam et al. | |
| 7,346,629 B2 | 3/2008 | Kapur et al. | |
| 7,353,224 B2 | 4/2008 | Chen et al. | |
| 7,376,672 B2 | 5/2008 | Weare | |
| 7,376,722 B1 | 5/2008 | Sim et al. | |
| 7,392,238 B1 | 6/2008 | Zhou et al. | |
| 7,406,459 B2 | 7/2008 | Chen et al. | |
| 7,433,895 B2 | 10/2008 | Li et al. | |
| 7,450,740 B2 | 11/2008 | Shah et al. | |
| 7,464,086 B2 | 12/2008 | Black et al. | |
| 7,519,238 B2 | 4/2009 | Robertson et al. | |
| 7,523,102 B2 | 4/2009 | Bjarnestam et al. | |
| 7,526,607 B1 | 4/2009 | Singh et al. | |
| 7,529,659 B2 | 5/2009 | Wold | |
| 7,536,384 B2 | 5/2009 | Venkataraman et al. | |
| 7,536,417 B2 | 5/2009 | Walsh et al. | |
| 7,542,969 B1 | 6/2009 | Rappaport et al. | |
| 7,548,910 B1 | 6/2009 | Chu et al. | |
| 7,555,477 B2 | 6/2009 | Bayley et al. | |
| 7,555,478 B2 | 6/2009 | Bayley et al. | |
| 7,562,076 B2 | 7/2009 | Kapur | |
| 7,574,436 B2 | 8/2009 | Kapur et al. | |
| 7,574,668 B2 | 8/2009 | Nunez et al. | |
| 7,577,656 B2 | 8/2009 | Kawai et al. | |
| 7,657,100 B2 | 2/2010 | Gokturk et al. | |
| 7,660,468 B2 | 2/2010 | Gokturk et al. | |
| 7,660,737 B1 | 2/2010 | Lim et al. | |
| 7,689,544 B2 | 3/2010 | Koenig | |
| 7,694,318 B2 | 4/2010 | Eldering et al. | |
| 7,697,791 B1 | 4/2010 | Chan et al. | |
| 7,769,221 B1 | 8/2010 | Shakes et al. | |
| 7,788,132 B2 | 8/2010 | Desikan et al. | |
| 7,788,247 B2 | 8/2010 | Wang et al. | |

(56) References Cited

U.S. PATENT DOCUMENTS

| | | |
|---|---|---|
| 7,801,893 B2 | 9/2010 | Gulli |
| 7,836,054 B2 | 11/2010 | Kawai et al. |
| 7,860,895 B1 | 12/2010 | Scofield |
| 7,904,503 B2 | 3/2011 | De |
| 7,920,894 B2 | 4/2011 | Wyler |
| 7,921,107 B2 | 4/2011 | Chang et al. |
| 7,933,407 B2 | 4/2011 | Keidar et al. |
| 7,974,994 B2 | 7/2011 | Li et al. |
| 7,987,194 B1 | 7/2011 | Walker et al. |
| 7,987,217 B2 | 7/2011 | Long et al. |
| 7,991,715 B2 | 8/2011 | Schiff et al. |
| 8,000,655 B2 | 8/2011 | Wang et al. |
| 8,023,739 B2 | 9/2011 | Hohimer et al. |
| 8,036,893 B2 | 10/2011 | Reich |
| 8,098,934 B2 | 1/2012 | Vincent |
| 8,112,376 B2 | 2/2012 | Raichelgauz et al. |
| 8,266,185 B2 | 9/2012 | Raichelgauz et al. |
| 8,275,764 B2 | 9/2012 | Jeon |
| 8,311,950 B1 | 11/2012 | Kunal |
| 8,312,031 B2 | 11/2012 | Raichelgauz et al. |
| 8,315,442 B2 | 11/2012 | Gokturk et al. |
| 8,316,005 B2 | 11/2012 | Moore |
| 8,326,775 B2 | 12/2012 | Raichelgauz et al. |
| 8,332,478 B2 | 12/2012 | Levy et al. |
| 8,345,982 B2 | 1/2013 | Gokturk et al. |
| RE44,225 E | 5/2013 | Aviv |
| 8,457,827 B1 | 6/2013 | Ferguson et al. |
| 8,495,489 B1 | 7/2013 | Everingham |
| 8,527,978 B1 | 9/2013 | Sallam |
| 8,548,828 B1 | 10/2013 | Longmire |
| 8,634,980 B1 | 1/2014 | Urmson |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,781,152 B2 | 7/2014 | Momeyer |
| 8,782,077 B1 | 7/2014 | Rowley |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,619 B2 | 10/2014 | Raichelgauz et al. |
| 8,868,861 B2 | 10/2014 | Shimizu et al. |
| 8,880,539 B2 | 11/2014 | Raichelgauz et al. |
| 8,880,566 B2 | 11/2014 | Raichelgauz et al. |
| 8,880,640 B2 | 11/2014 | Graham |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 8,990,199 B1 | 3/2015 | Ramesh et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,252,961 B2 | 2/2016 | Bosworth |
| 9,256,668 B2 | 2/2016 | Raichelgauz et al. |
| 9,298,763 B1 | 3/2016 | Zack |
| 9,323,754 B2 | 4/2016 | Ramanathan et al. |
| 9,325,751 B2 | 4/2016 | Bosworth |
| 9,330,189 B2 | 5/2016 | Raichelgauz et al. |
| 9,384,196 B2 | 7/2016 | Raichelgauz et al. |
| 9,438,270 B2 | 9/2016 | Raichelgauz et al. |
| 9,440,647 B1 | 9/2016 | Sucan |
| 9,466,068 B2 | 10/2016 | Raichelgauz et al. |
| 9,542,694 B2 | 1/2017 | Bosworth |
| 9,606,992 B2 | 3/2017 | Geisner et al. |
| 9,646,006 B2 | 5/2017 | Raichelgauz et al. |
| 9,679,062 B2 | 6/2017 | Schillings et al. |
| 9,734,533 B1 | 8/2017 | Givot |
| 9,807,442 B2 | 10/2017 | Bhatia et al. |
| 9,875,445 B2 | 1/2018 | Amer et al. |
| 9,911,334 B2 | 3/2018 | Townsend |
| 9,984,369 B2 | 5/2018 | Li et al. |
| 9,996,845 B2 | 6/2018 | Zhang |
| 10,133,947 B2 | 11/2018 | Yang |
| 10,347,122 B2 | 7/2019 | Takenaka |
| 10,491,885 B1 | 11/2019 | Hicks |
| 2001/0019633 A1 | 9/2001 | Tenze |
| 2001/0038876 A1 | 11/2001 | Anderson |
| 2001/0056427 A1 | 12/2001 | Yoon et al. |
| 2002/0010682 A1 | 1/2002 | Johnson |
| 2002/0010715 A1* | 1/2002 | Chinn .................. G06F 3/16 715/236 |
| 2002/0019881 A1 | 2/2002 | Bokhari et al. |
| 2002/0019882 A1 | 2/2002 | Soejima |
| 2002/0032677 A1 | 3/2002 | Morgenthaler et al. |
| 2002/0037010 A1 | 3/2002 | Yamauchi |
| 2002/0038299 A1 | 3/2002 | Zernik et al. |
| 2002/0042914 A1 | 4/2002 | Walker et al. |
| 2002/0059580 A1 | 5/2002 | Kalker et al. |
| 2002/0072935 A1 | 6/2002 | Rowse et al. |
| 2002/0087530 A1 | 7/2002 | Smith et al. |
| 2002/0087828 A1 | 7/2002 | Arimilli et al. |
| 2002/0099870 A1 | 7/2002 | Miller et al. |
| 2002/0103813 A1 | 8/2002 | Frigon |
| 2002/0107827 A1 | 8/2002 | Benitez-Jimenez et al. |
| 2002/0113812 A1 | 8/2002 | Walker et al. |
| 2002/0123928 A1 | 9/2002 | Eldering et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152087 A1 | 10/2002 | Gonzalez |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas |
| 2002/0174095 A1 | 11/2002 | Lulich et al. |
| 2002/0178410 A1 | 11/2002 | Haitsma et al. |
| 2002/0184505 A1 | 12/2002 | Mihcak |
| 2003/0005432 A1 | 1/2003 | Ellis et al. |
| 2003/0028660 A1 | 2/2003 | Igawa et al. |
| 2003/0037010 A1 | 2/2003 | Schmelzer |
| 2003/0041047 A1 | 2/2003 | Chang |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0093790 A1 | 5/2003 | Logan et al. |
| 2003/0101150 A1 | 5/2003 | Agnihotri |
| 2003/0105739 A1 | 6/2003 | Essafi et al. |
| 2003/0115191 A1 | 6/2003 | Copperman et al. |
| 2003/0126147 A1 | 7/2003 | Essafi et al. |
| 2003/0182567 A1 | 9/2003 | Barton et al. |
| 2003/0184598 A1 | 10/2003 | Graham |
| 2003/0191764 A1 | 10/2003 | Richards |
| 2003/0191776 A1 | 10/2003 | Obrador |
| 2003/0200217 A1 | 10/2003 | Ackerman |
| 2003/0217335 A1 | 11/2003 | Chung |
| 2003/0229531 A1 | 12/2003 | Heckerman et al. |
| 2004/0003394 A1 | 1/2004 | Ramaswamy |
| 2004/0025180 A1 | 2/2004 | Begeja et al. |
| 2004/0047461 A1 | 3/2004 | Weisman |
| 2004/0059736 A1 | 3/2004 | Willse |
| 2004/0068510 A1 | 4/2004 | Hayes et al. |
| 2004/0091111 A1 | 5/2004 | Levy |
| 2004/0095376 A1 | 5/2004 | Graham et al. |
| 2004/0098671 A1 | 5/2004 | Graham et al. |
| 2004/0107181 A1 | 6/2004 | Rodden |
| 2004/0111432 A1 | 6/2004 | Adams et al. |
| 2004/0111465 A1 | 6/2004 | Chuang et al. |
| 2004/0117367 A1 | 6/2004 | Smith et al. |

(56) References Cited

U.S. PATENT DOCUMENTS

| | | |
|---|---|---|
| 2004/0117638 A1 | 6/2004 | Monroe |
| 2004/0119848 A1 | 6/2004 | Buehler |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0230572 A1 | 11/2004 | Omoigui |
| 2004/0249779 A1 | 12/2004 | Nauck et al. |
| 2004/0260688 A1 | 12/2004 | Gross |
| 2004/0267774 A1 | 12/2004 | Lin |
| 2005/0010553 A1 | 1/2005 | Liu |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0163375 A1 | 7/2005 | Grady |
| 2005/0172130 A1 | 8/2005 | Roberts |
| 2005/0177372 A1 | 8/2005 | Wang et al. |
| 2005/0193015 A1 | 9/2005 | Logston |
| 2005/0238198 A1 | 10/2005 | Brown et al. |
| 2005/0238238 A1 | 10/2005 | Xu et al. |
| 2005/0245241 A1 | 11/2005 | Durand et al. |
| 2005/0249398 A1* | 11/2005 | Khamene ............... G06T 7/38 382/154 |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0033163 A1 | 2/2006 | Chen |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0100987 A1 | 5/2006 | Leurs |
| 2006/0112035 A1 | 5/2006 | Cecchi et al. |
| 2006/0120626 A1 | 6/2006 | Perlmutter |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton |
| 2006/0251292 A1 | 11/2006 | Gokturk |
| 2006/0251338 A1 | 11/2006 | Gokturk |
| 2006/0251339 A1 | 11/2006 | Gokturk |
| 2006/0253423 A1 | 11/2006 | McLane et al. |
| 2006/0288002 A1 | 12/2006 | Epstein |
| 2007/0009159 A1 | 1/2007 | Fan |
| 2007/0011151 A1 | 1/2007 | Hagar et al. |
| 2007/0019864 A1 | 1/2007 | Koyama et al. |
| 2007/0022374 A1 | 1/2007 | Huang et al. |
| 2007/0033163 A1 | 2/2007 | Epstein et al. |
| 2007/0038608 A1 | 2/2007 | Chen |
| 2007/0038614 A1 | 2/2007 | Guha |
| 2007/0042757 A1 | 2/2007 | Jung et al. |
| 2007/0050411 A1* | 3/2007 | Hull ............... G06F 16/434 |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130112 A1 | 6/2007 | Lin |
| 2007/0130159 A1 | 6/2007 | Gulli et al. |
| 2007/0156720 A1 | 7/2007 | Maren |
| 2007/0168413 A1 | 7/2007 | Barletta et al. |
| 2007/0174320 A1 | 7/2007 | Chou |
| 2007/0195987 A1 | 8/2007 | Rhoads |
| 2007/0196013 A1 | 8/2007 | Li |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2007/0298152 A1 | 12/2007 | Baets |
| 2008/0019614 A1 | 1/2008 | Robertson et al. |
| 2008/0040277 A1 | 2/2008 | DeWitt |
| 2008/0046406 A1 | 2/2008 | Seide et al. |
| 2008/0049629 A1 | 2/2008 | Morrill |
| 2008/0049789 A1 | 2/2008 | Vedantham et al. |
| 2008/0072256 A1 | 3/2008 | Boicey et al. |
| 2008/0079729 A1* | 4/2008 | Brailovsky ............ G06K 9/48 345/443 |
| 2008/0091527 A1 | 4/2008 | Silverbrook et al. |
| 2008/0109433 A1 | 5/2008 | Rose |
| 2008/0152231 A1 | 6/2008 | Gokturk |
| 2008/0159622 A1 | 7/2008 | Agnihotri et al. |
| 2008/0163288 A1 | 7/2008 | Ghosal et al. |
| 2008/0165861 A1 | 7/2008 | Wen |
| 2008/0166020 A1 | 7/2008 | Kosaka |
| 2008/0172615 A1 | 7/2008 | Igelman et al. |
| 2008/0201299 A1 | 8/2008 | Lehikoinen et al. |
| 2008/0201314 A1 | 8/2008 | Smith et al. |
| 2008/0201326 A1 | 8/2008 | Cotter |
| 2008/0201361 A1 | 8/2008 | Castro et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson |
| 2008/0307454 A1 | 12/2008 | Ahanger et al. |
| 2008/0313140 A1 | 12/2008 | Pereira et al. |
| 2009/0013414 A1 | 1/2009 | Washington et al. |
| 2009/0022472 A1 | 1/2009 | Bronstein |
| 2009/0024641 A1 | 1/2009 | Quigley et al. |
| 2009/0034791 A1 | 2/2009 | Doretto |
| 2009/0037408 A1 | 2/2009 | Rodgers |
| 2009/0043637 A1 | 2/2009 | Eder |
| 2009/0043818 A1 | 2/2009 | Raichelgauz |
| 2009/0080759 A1 | 3/2009 | Bhaskar |
| 2009/0089251 A1 | 4/2009 | Johnston |
| 2009/0089587 A1 | 4/2009 | Brunk et al. |
| 2009/0119157 A1 | 5/2009 | Dulepet |
| 2009/0125529 A1 | 5/2009 | Vydiswaran et al. |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0204511 A1 | 8/2009 | Tsang |
| 2009/0208106 A1 | 8/2009 | Dunlop et al. |
| 2009/0216639 A1 | 8/2009 | Kapczynski et al. |
| 2009/0216761 A1 | 8/2009 | Raichelgauz |
| 2009/0220138 A1 | 9/2009 | Zhang et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0254572 A1 | 10/2009 | Redlich et al. |
| 2009/0254824 A1 | 10/2009 | Singh |
| 2009/0259687 A1 | 10/2009 | Mai et al. |

(56) References Cited

U.S. PATENT DOCUMENTS

| | | |
|---|---|---|
| 2009/0277322 A1 | 11/2009 | Cai et al. |
| 2009/0278934 A1 | 11/2009 | Ecker |
| 2009/0282218 A1 | 11/2009 | Raichelgauz et al. |
| 2009/0297048 A1 | 12/2009 | Slotine et al. |
| 2010/0023400 A1 | 1/2010 | DeWitt |
| 2010/0042646 A1 | 2/2010 | Raichelqauz |
| 2010/0082684 A1 | 4/2010 | Churchill |
| 2010/0088321 A1 | 4/2010 | Solomon et al. |
| 2010/0104184 A1 | 4/2010 | Bronstein |
| 2010/0106857 A1 | 4/2010 | Wyler |
| 2010/0111408 A1 | 5/2010 | Matsuhira |
| 2010/0125569 A1 | 5/2010 | Nair |
| 2010/0162405 A1 | 6/2010 | Cook |
| 2010/0173269 A1 | 7/2010 | Puri et al. |
| 2010/0191567 A1 | 7/2010 | Lee et al. |
| 2010/0198626 A1 | 8/2010 | Cho et al. |
| 2010/0212015 A1 | 8/2010 | Jin et al. |
| 2010/0268524 A1 | 10/2010 | Nath et al. |
| 2010/0284604 A1* | 11/2010 | Chrysanthakopoulos ................... G06F 17/30256 382/153 |
| 2010/0306193 A1 | 12/2010 | Pereira |
| 2010/0312736 A1 | 12/2010 | Kello |
| 2010/0318493 A1 | 12/2010 | Wessling |
| 2010/0322522 A1 | 12/2010 | Wang et al. |
| 2010/0325138 A1 | 12/2010 | Lee et al. |
| 2010/0325581 A1 | 12/2010 | Finkelstein et al. |
| 2011/0029620 A1 | 2/2011 | Bonforte |
| 2011/0035289 A1 | 2/2011 | King et al. |
| 2011/0038545 A1 | 2/2011 | Bober |
| 2011/0052063 A1 | 3/2011 | McAuley et al. |
| 2011/0055585 A1 | 3/2011 | Lee |
| 2011/0106782 A1 | 5/2011 | Ke et al. |
| 2011/0125727 A1 | 5/2011 | Zou et al. |
| 2011/0145068 A1 | 6/2011 | King et al. |
| 2011/0164180 A1 | 7/2011 | Lee |
| 2011/0164810 A1* | 7/2011 | Zang ........................ G06T 17/00 382/154 |
| 2011/0202848 A1 | 8/2011 | Ismalon |
| 2011/0208822 A1 | 8/2011 | Rathod |
| 2011/0218946 A1 | 9/2011 | Stern et al. |
| 2011/0246566 A1 | 10/2011 | Kashef |
| 2011/0251896 A1 | 10/2011 | Impollonia et al. |
| 2011/0276680 A1 | 11/2011 | Rimon |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0133497 A1 | 5/2012 | Sasaki |
| 2012/0150890 A1 | 6/2012 | Jeong et al. |
| 2012/0167133 A1 | 6/2012 | Carroll |
| 2012/0179642 A1 | 7/2012 | Sweeney et al. |
| 2012/0179751 A1 | 7/2012 | Ahn |
| 2012/0185445 A1 | 7/2012 | Borden et al. |
| 2012/0191686 A1 | 7/2012 | Hjelm et al. |
| 2012/0197857 A1 | 8/2012 | Huang |
| 2012/0221470 A1 | 8/2012 | Lyon |
| 2012/0227074 A1 | 9/2012 | Hill et al. |
| 2012/0229028 A1 | 9/2012 | Ackermann |
| 2012/0239690 A1 | 9/2012 | Asikainen et al. |
| 2012/0239694 A1 | 9/2012 | Avner et al. |
| 2012/0299961 A1 | 11/2012 | Ramkumar et al. |
| 2012/0301105 A1 | 11/2012 | Rehg et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0080433 A1 | 3/2013 | Raichelgauz et al. |
| 2013/0086499 A1 | 4/2013 | Dyor et al. |
| 2013/0089248 A1 | 4/2013 | Remiszewski |
| 2013/0103814 A1 | 4/2013 | Carrasco |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0191323 A1 | 7/2013 | Raichelgauz |
| 2013/0211656 A1 | 8/2013 | An |
| 2013/0212493 A1 | 8/2013 | Krishnamurthy |
| 2013/0226820 A1 | 8/2013 | Sedota, Jr. |
| 2013/0226930 A1 | 8/2013 | Arngren |
| 2013/0283401 A1 | 10/2013 | Pabla et al. |
| 2013/0311924 A1 | 11/2013 | Denker et al. |
| 2013/0325550 A1 | 12/2013 | Varghese et al. |
| 2013/0332951 A1 | 12/2013 | Gharaat et al. |
| 2014/0019264 A1 | 1/2014 | Wachman et al. |
| 2014/0025692 A1 | 1/2014 | Pappas |
| 2014/0040232 A1 | 2/2014 | Raichelgauz |
| 2014/0059443 A1 | 2/2014 | Tabe |
| 2014/0095425 A1 | 4/2014 | Sipple |
| 2014/0111647 A1 | 4/2014 | Atsmon |
| 2014/0125703 A1 | 5/2014 | Roveta |
| 2014/0147829 A1 | 5/2014 | Jerauld |
| 2014/0149443 A1 | 5/2014 | Raichelgauz |
| 2014/0152698 A1 | 6/2014 | Kim et al. |
| 2014/0169681 A1 | 6/2014 | Drake |
| 2014/0176604 A1 | 6/2014 | Venkitaraman et al. |
| 2014/0188786 A1 | 7/2014 | Raichelgauz |
| 2014/0189536 A1 | 7/2014 | Lange |
| 2014/0193077 A1 | 7/2014 | Shiiyama et al. |
| 2014/0201330 A1 | 7/2014 | Lozano Lopez |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0330830 A1 | 11/2014 | Raichelgauz et al. |
| 2014/0341471 A1 | 11/2014 | Ono |
| 2014/0341476 A1 | 11/2014 | Kulick et al. |
| 2014/0379477 A1 | 12/2014 | Sheinfeld |
| 2015/0009129 A1 | 1/2015 | Song |
| 2015/0033150 A1 | 1/2015 | Lee |
| 2015/0081725 A1 | 3/2015 | Ogawa |
| 2015/0100562 A1 | 4/2015 | Kohlmeier et al. |
| 2015/0117784 A1 | 4/2015 | Lin |
| 2015/0120627 A1 | 4/2015 | Hunzinger et al. |
| 2015/0134318 A1 | 5/2015 | Cuthbert |
| 2015/0134688 A1 | 5/2015 | Jing |
| 2015/0154189 A1 | 6/2015 | Raichelgauz |
| 2015/0242689 A1 | 8/2015 | Mau |
| 2015/0254344 A1 | 9/2015 | Kulkarni et al. |
| 2015/0286742 A1 | 10/2015 | Zhang et al. |
| 2015/0289022 A1 | 10/2015 | Gross |
| 2015/0317836 A1 | 11/2015 | Beaurepatre |
| 2015/0324356 A1 | 11/2015 | Gutierrez et al. |
| 2015/0363644 A1 | 12/2015 | Wnuk |
| 2016/0007083 A1 | 1/2016 | Gurha |
| 2016/0026707 A1 | 1/2016 | Ong et al. |
| 2016/0171785 A1 | 6/2016 | Banatwala |
| 2016/0210525 A1 | 7/2016 | Yang |
| 2016/0221592 A1 | 8/2016 | Puttagunta |
| 2016/0239566 A1 | 8/2016 | Raichelgauz et al. |
| 2016/0306798 A1 | 10/2016 | Guo et al. |
| 2016/0307048 A1 | 10/2016 | Krishnamoorthy |
| 2016/0342683 A1 | 11/2016 | Kwon |
| 2016/0342863 A1 | 11/2016 | Kwon |
| 2016/0357188 A1 | 12/2016 | Ansari |
| 2017/0017638 A1 | 1/2017 | Satyavarta et al. |
| 2017/0032257 A1 | 2/2017 | Sharifi |
| 2017/0041254 A1 | 2/2017 | Agara Venkatesha Rao |
| 2017/0066452 A1 | 3/2017 | Scofield |
| 2017/0072851 A1 | 3/2017 | Shenoy |
| 2017/0109602 A1 | 4/2017 | Kim |
| 2017/0150047 A1 | 5/2017 | Jung |
| 2017/0154241 A1 | 6/2017 | Shambik et al. |
| 2017/0255620 A1 | 9/2017 | Raichelgauz |
| 2017/0259819 A1 | 9/2017 | Takeda |
| 2017/0262437 A1 | 9/2017 | Raichelgauz |
| 2017/0277691 A1 | 9/2017 | Agarwal |
| 2017/0323568 A1 | 11/2017 | Inoue |
| 2018/0081368 A1 | 3/2018 | Watanabe |
| 2018/0101177 A1 | 4/2018 | Cohen |
| 2018/0157916 A1 | 6/2018 | Doumbouya |
| 2018/0158323 A1 | 6/2018 | Takenaka |
| 2018/0204111 A1 | 7/2018 | Zadeh |

(56) References Cited

U.S. PATENT DOCUMENTS

| | | |
|---|---|---|
| 2018/0286239 A1 | 10/2018 | Kaloyeros |
| 2018/0300654 A1 | 10/2018 | Prasad |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0061784 A1 | 2/2019 | Koehler |
| 2019/0065951 A1 | 2/2019 | Luo |
| 2019/0188501 A1 | 6/2019 | Ryu |
| 2019/0220011 A1 | 7/2019 | Della Penna |
| 2019/0236954 A1 | 8/2019 | Komura |
| 2019/0317513 A1 | 10/2019 | Zhang |
| 2019/0320512 A1 | 10/2019 | Zhang |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2019/0392710 A1 | 12/2019 | Kapoor |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |

FOREIGN PATENT DOCUMENTS

| | | |
|---|---|---|
| WO | 0231764 A2 | 4/2002 |
| WO | 2003005242 A1 | 1/2003 |
| WO | 2003067467 A1 | 8/2003 |
| WO | 2004019527 A1 | 3/2004 |
| WO | 2005027457 A1 | 3/2005 |
| WO | 2007049282 A2 | 5/2007 |
| WO | 20070049282 | 5/2007 |
| WO | 2014076002 A1 | 5/2014 |
| WO | 2014137337 A1 | 9/2014 |
| WO | 2016040376 A1 | 3/2016 |
| WO | 2016070193 A1 | 5/2016 |

OTHER PUBLICATIONS

May et al., "The Transputer", Springer-Verlag, Berlin Heidelberg, 1989, teaches multiprocessing system.

Nam, et al., "Audio Visual Content-Based Violent Scene Characterization", Department of Electrical and Computer Engineering, Minneapolis, MN, 1998, pp. 353-357.

Vailaya, et al., "Content-Based Hierarchical Classification of Vacation Images," I.E.E.E.: Multimedia Computing and Systems, vol. 1, 1999, East Lansing, MI, pp. 518-523.

Vallet, et al., "Personalized Content Retrieval in Context Using Ontological Knowledge," IEEE Transactions on Circuits and Systems for Video Technology, vol. 17, No. 3, Mar. 2007, pp. 336-346.

Whitby-Strevens, "The Transputer", 1985 IEEE, Bristol, UK.

Yanai, "Generic Image Classification Using Visual Knowledge on the Web," MM'03, Nov. 2-8, 2003, Tokyo, Japan, pp. 167-176.

Guo et al., "AdOn: An Intelligent Overlay Video Advertising System", SIGIR, Boston, Massachusetts, Jul. 19-23, 2009.

Mei, et al., "Contextual In-Image Advertising", Microsoft Research Asia, pp. 439-448, 2008.

Mei, et al., "VideoSense—Towards Effective Online Video Advertising", Microsoft Research Asia, pp. 1075-1084, 2007.

Semizarov et al. "Specificity of Short Interfering RNA Determined through Gene Expression Signatures", PNAS, 2003, pp. 6347-6352.

Queluz, "Content-Based Integrity Protection of Digital Images", SPIE Conf. on Security and Watermarking of Multimedia Contents, San Jose, Jan. 1999, pp. 85-93, downloaded from http://proceedings.spiedigitallibrary.org/ on Aug. 2, 2017.

Schneider, et al., "A Robust Content Based Digital Signature for Image Authentication", Proc. ICIP 1996, Laussane, Switzerland, Oct. 1996, pp. 227-230.

Yanagawa, et al., "Columbia University's Baseline Detectors for 374 LSCOM Semantic Visual Concepts." Columbia University ADVENT technical report, 2007, pp. 222-2006-8.

International Search Authority: International Preliminary Report on Patentability (Chapter I of the Patent Cooperation Treaty) including "Written Opinion of the International Searching Authority" (PCT Rule 43bis. 1) for the related International Patent Application No. PCT/IL2006/001235; dated Jul. 28, 2009.

Automatic Diagnosis of Defects of Rolling Element Bearings Based on Computational Intelligence Techniques, Cococcioni, etal, University of Pisa, Pisa, Italy, 2009.

Boari et al., "Adaptive Routing for Dynamic Applications in Massively Parallel Architectures", 1995 IEEE, Spring 1995.

Cernansky et al., "Feed-forward Echo State Networks"; Proceedings of International Joint Conference on Neural Networks, Montreal, Canada, Jul. 31-Aug. 4, 2005.

Emotional Speech Characterization Based on Multi-Features Fusion for Face-to-Face Interaction, Mahdhaoui, et al., Universite Pierre et Marie Curie, Paris, France, 2009.

Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.

Foote, Jonathan et al., "Content-Based Retrieval of Music and Audio"; 1997, Institute of Systems Science, National University of Singapore, Singapore (ABSTRACT).

International Search Authority: "Written Opinion of the International Searching Authority" (PCT Rule 43bis. 1) including International Search Report for the related International Patent Application No. PCT/US2008/073852; dated Jan. 28, 2009; Entire Document.

International Search Report for the related International Patent Application PCT/IL2006/001235 dated Nov. 2, 2008.

IPO Examination Report under Section 18(3) for corresponding UK application No. GB1001219.3, dated May 30, 2012.

Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.

Jaeger, H.: "The "echo state" approach to analysing and training recurrent neural networks", GMD Report, No. 148, 2001, pp. 1-43, XP002466251. German National Research Center for Information Technology.

Lin, C.; Chang, S.;, "Generating Robust Digital Signature for Image/Video Authentication," Multimedia and Security Workshop at ACM Multimedia '98. Bristol, U.K. Sep. 1998, pp. 49-54.

Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.

Maass, W. et al.: "Computational Models for Generic Cortical Microcircuits", Institute for Theoretical Computer Science, Technische Universitaet Graz, Graz, Austria, published Jun. 10, 2003.

Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.

Nagy et al., "A Transputer, Based, Flexible, Real-Time Control System for Robotic Manipulators", UKACC International Conference on CONTROL '96, Sep. 2-5, 1996, Conference 1996, Conference Publication No. 427, IEE 1996.

Natsclager, T. et al.: "The "liquid computer": A novel strategy for real-time computing on time series", Special Issue on Foundations of Information Processing of Telematik, vol. 8, No. 1, 2002, pp. 39-43, XP002466253.

(56) References Cited

OTHER PUBLICATIONS

Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.
Real Time Speaker Localization and Detection System for Camera Steering in Multiparticipant Videoconferencing Environments, Marti, et al., Universidad Politecnica de Valencia, Spain, 2011.
Ribert et al. "An Incremental Hierarchical Clustering", Visicon Interface 1999, pp. 586-591.
Role of Spatiotemporal Oriented Energy Features for Robust Visual Tracking in Video Surveillance, Emami, et al., University of Queensland, St. Lucia, Australia, 2012.
Scheper, et al. "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Theodoropoulos et al., "Simulating Asynchronous Architectures on Transputer Networks", Proceedings of the Fourth Euromicro Workshop On Parallel and Distributed Processing, 1996. PDP '96.
Verstraeten et al., "Isolated word recognition with the Liquid State Machine; a case study"; Department of Electronics and Information Systems, Ghent University, Sint-Pietersnieuwstraat 41, 9000 Gent, Belgium, Available online Jul. 14, 2005; Entire Document.
Verstraeten et al.: "Isolated word recognition with the Liquid State Machine; a case study", Information Processing Letters, Amsterdam, NL, col. 95, No. 6, Sep. 30, 2005 (Sep. 30, 2005), pp. 521-528, XP005028093 ISSN: 0020-0190.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.
Zhou et al., "Ensembling neural networks: Many could be better than all"; National Laboratory for Novel Software Technology, Nanjing Unviersirty, Hankou Road 22, Nanjing 210093, PR China; Available online Mar. 12, 2002.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Wang et al. "A Signature for Content-based Image Retrieval Using a Geometrical Transform", ACM 1998, pp. 229-234.
Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.
Chuan-Yu Cho, et al., "Efficient Motion-Vector-Based Video Search Using Query by Clip", 2004, IEEE, Taiwan, pp. 1-4.
Gomes et al., "Audio Watermaking and Fingerprinting: For Which Applications?" University of Rene Descartes, Paris, France, 2003.

Ihab Al Kabary, et al., "SportSense: Using Motion Queries to Find Scenes in Sports Videos", Oct. 2013, ACM, Switzerland, pp. 1-3.
Jianping Fan et al., "Concept-Oriented Indexing of Video Databases: Towards Semantic Sensitive Retrieval and Browsing", IEEE, vol. 13, No. 7, Jul. 2004, pp. 1-19.
Shih-Fu Chang, et al., "VideoQ: A Fully Automated Video Retrieval System Using Motion Sketches", 1998, IEEE, , New York, pp. 1-2.
Wei-Te Li et al., "Exploring Visual and Motion Saliency for Automatic Video Object Extraction", IEEE, vol. 22, No. 7, Jul. 2013, pp. 1-11.
Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.
Brecheisen, et al., "Hierarchical Genre Classification for Large Music Collections", ICME 2006, pp. 1385-1388.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
Mcnamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.
Santos, et al., "SCORM-MPEG: an Ontology of Interoperable Metadata for Multimedia and e-Learning", 2015 23rd International Conference on Software, Telecommunications and Computer Networks (SoftCOM) Year: 2015, pp. 224-228, DOI: 10.1109/SOFTCOM. 2015.7314122 IEEE Conference Publications.
Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.
Johnson, John L., "Pulse-Coupled Neural Nets: Translation, Rotation, Scale, Distortion, and Intensity Signal Invariance for Images." Applied Optics, vol. 33, No. 26, 1994, pp. 6239-6253.
The International Search Report and the Written Opinion for PCT/US2016/050471, ISA/RU, Moscow, RU, dated May 4, 2017.
The International Search Report and the Written Opinion for PCT/US2017/015831, ISA/RU, Moscow, Russia, dated Apr. 20, 2017.
Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.
Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004. 1434102 IEEE Conference Publications, Hong Kong.
Lin, et al., "Robust Digital Signature for Multimedia Authentication: A Summary", IEEE Circuits and Systems Magazine, 4th Quarter 2003, pp. 23-26.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Odinaev, et al., "Cliques in Neural Ensembles as Perception Carriers", Technion—Israel Institute of Technology, 2006 International Joint Conference on Neural Networks, Canada, 2006, pp. 285-292.
The International Search Report and the Written Opinion for PCT/US2016/054634 dated Mar. 16, 2017, ISA/RU, Moscow, RU.
Hogue, "Tree Pattern Inference and Matching for Wrapper Induction on the World Wide Web", Master's Thesis, Massachusetts institute of Technology, 2004, pp. 1-106.

(56) References Cited

OTHER PUBLICATIONS

Mcnamara et al., "Diversity Decay in opportunistic Content Sharing Systems", 2011 IEEE International Symposium an a World of Wireless, Mobile and Multimedia Networks, pp. 1-3.
Rui, Yong et al. "Relevance feedback: a power tool for interactive content-based image retrieval." IEEE Transactions on circuits and systems for video technology 8.5 (1998): 644-655.
Wang et al., "Classifying Objectionable Websites Based onImage Content", Stanford University, pp. 1-12.
Big Bang Theory Series 04 Episode 12, aired Jan. 6, 2011; [retrieved from Internet: ].
Boari et al., "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Cernansky et al., "Feed-forward Echo State Networks", Proceedings of International Joint Conference on Neural Networks, Montreal, Canada, Jul. 31-Aug. 4, 2005, pp. 1-4.
Chinchor, Nancy A. et al.; Multimedia Analysis + Visual Analytics = Multimedia Analytics; IEEE Computer Society 2010; pp. 52-60. (Year: 2010).
Fathy et al., "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al., "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Hogue, "Tree Pattern Inference and Matching for Wrapper Induction on the World Wide Web", Master's Thesis, Massachusetts Institute of Technology, Jun. 2004, pp. 1-106.
Howlett et al., "A Multi-Computer Neural Network Architecture in a Virtual Sensor System Application", International journal of knowledge-based intelligent engineering systems, 4 (2). pp. 86-93, 133N 1327-2314.
Hua et al., "Robust Video Signature Based on Ordinal Measure", Image Processing, 2004, 2004 International Conference on Image Processing (ICIP), vol. 1, IEEE, pp. 685-688, 2004.
International Search Report and Written Opinion for PCT/US2016/050471, ISA/RU, Moscow, RU, dated May 4, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Lin et al., "Generating robust digital signature for image/video authentication", Multimedia and Security Workshop at ACM Multimedia '98, Bristol, U.K., Sep. 1998, pp. 245-251.
Lu et al., "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.
May et al., "The Transputer", Springer-Verlag Berlin Heidelberg 1989, vol. 41.
Mcnamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al., "A Transputer, Based, Flexible, Real-Time Control System for Robotic Manipulators", UKACC International Conference on CONTROL '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al., "Cliques in Neural Ensembles as Perception Carriers", Technion—Institute of Technology, 2006 International Joint Conference on neural Networks, Canada, 2006, pp. 285-292.
Ortiz-Boyer et al., "CIXL2: A Crossover Operator for Evolutionary Algorithms Based on Population Features", Journal of Artificial Intelligence Research 24 (2005) Submitted Nov. 2004; published Jul. 2005, pp. 1-48.
Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).
Queluz, "Content-Based Integrity Protection of Digital Images", SPIE Conf. on Security and Watermarking of Multimedia Contents, San Jose, Jan. 1999, pp. 85-93.
Rui, Yong et al. "Relevance feedback: a power tool for interactive content-based image retrieval." IEEE Transactions an circuits and systems for video technology 8.5 (1998): 644-655.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al., "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al., "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.
Stolberg et al., "Hibrid-Soc: A Mul Ti-Core Soc Architecture for Mul Timedia Signal Processing", 2003 IEEE, pp. 189-194.
Theodoropoulos et al., "Simulating Asynchronous Architectures on Transputer Networks", Proceedings of the Fourth Euromicro Workshop on Parallel and Distributed Processing, 1996. PDP '96, pp. 274-281.
Verstraeten et al., "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al., "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.

(56) References Cited

OTHER PUBLICATIONS

Yanagawa et al., "Columbia University's Baseline Detectors for 374 LSCOM Semantic Visual Concepts", Columbia University ADVENT Technical Report # 222-2006-8, Mar. 20, 2007, pp. 1-17.
Yanagawa et al., "Columbia University's Baseline Detectors for 374 LSCOM Semantic Visual Concepts", Columbia University ADVENT Technical Report #222, 2007, pp. 2006-2008.
Zhou et al., "Ensembling neural networks: Many could be better than all", National Laboratory for Novel Software Technology, Nanjing University, Hankou Road 22, Nanjing 210093, PR China, Available online Mar. 12, 2002, pp. 239-263.
Zhou et al., "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.
Ma et el. ("Semantics modeling based image retrieval system using neural networks" 2005 (Year: 2005).
"Computer Vision Demonstration Website", Electronics and Computer Science, University of Southampton, 2005, USA.
Guo et al, AdOn: An Intelligent Overlay Video Advertising System (Year: 2009).
Li et al ("Matching Commercial Clips from TV Streams Using a Unique, Robust and Compact Signature" 2005) (Year: 2005).
Stolberg et al ("Hibrid-Soc: A Multi-Core Soc Architecture for Multimedia Signal Processing" 2003).
Vallet et al ("Personalized Content Retrieval in Context Using Ontological Knowledge" Mar. 2007) (Year: 2007).
Jasinschi et al., A Probabilistic Layered Framework for Integrating Multimedia Content and Context Information, 2002, IEEE, p. 2057-2060. (Year: 2002).
Jones et al., "Contextual Dynamics of Group-Based Sharing Decisions", 2011, University of Bath, p. 1777-1786. (Year: 2011).
Iwamoto, "Image Signature Robust to Caption Superimpostion for Video Sequence Identification", IEEE, pp. 3185-3188 (Year: 2006).
Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).
Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).
Wusk et al (Non-Invasive detection of Respiration and Heart Rate with a Vehicle Seat Sensor; www.mdpi.com/journal/sensors; Published: May 8, 2018). (Year: 2018).
Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).
Lai, Wei-Sheng, et al. "Deep laplacian pyramid networks for fast and accurate superresolution." Proceedings of the IEEE conference on computer vision and pattern recognition. 2017 (Year: 2017).
Ren, Shaoqing, et al. "Faster r-cnn: Towards real-time object detection with region proposal networks." IEEE transactions on pattern analysis and machine intelligence 39.6 (2016): 1137-1149 (Year: 2016).
Felzenszwalb, Pedro F., et al. "Object detection with discriminatively trained partbased models." IEEE transactions on pattern analysis and machine intelligence 32.9 (2009): 1627-1645. (Year: 2009).
Lin, Tsung-Yi, et al. "Feature pyramid networks for object detection." Proceedings of the IEEE conference on computer vision and pattern recognition. 2017. (Year: 2017).
Jasinschi, Radu S., et al. "A probabilistic layered framework for integrating multimedia content and context information." 2002 IEEE International Conference on Acoustics, Speech, and Signal Processing. vol. 2. IEEE, 2002. (Year: 2002).
Gull et al., "A Clustering Technique to Rise Up the Marketing Tactics by Looking Out the Key Users Taking Facebook as a Case study", 2014, IEEE International Advance Computing Conference (IACC), 579-585 (Year: 2014).
Zhang et al., "Dynamic Estimation of Family Relations from Photos", 2011, Advances in Multimedia Modeling. MMM 2011, pp. 65-76 (Year: 2011).
Chen, "CLUE: Cluster-Based Retrieval of Images by Unsupervised Learning", IEEE, vol. 14 pp. 1187-1201 (Year: 2005).
Troung, "CASIS: A System for Concept-Aware Social Image Search", 2012 (Year: 2012).
Cody, W.F. et al. (Mar. 1995). "Querying multimedia data from multiple repositories by content: the Garlic project". In Working Conference on Visual Database Systems (pp. 17-35). Springer, Boston, MA. (Year: 1995).
Schneider, J.M. (Oct. 2015). "New approaches to interactive multimedia content retrieval from different sources". Diss. Universidad Carlos Ill de Madrid. 274 pages. (Year: 2015).
Yong, N .S. (2008). "Combining multi modal external resources for event-based news video retrieval and question answering". PhD Diss, National University Singapore. 140 pages. (Year: 2008.
Kennedy, L. et al. (2008). "Query-adaptive fusion for multimodal search". Proceedings of the IEEE, 96(4), 567-588. (Year: 2008).
Sang Hyun Joo, "Real time traversability analysis to enhance rough terrain navigation for an 6x6 autonomous vehicle", 2013 (Year: 2013).

* cited by examiner

SYSTEM AND METHOD FOR GENERATING SIGNATURES TO THREE-DIMENSIONAL MULTIMEDIA DATA ELEMENTS

CROSS-REFERENCE TO RELATED APPLICATIONS

This application claims the benefit of U.S. Provisional Application 61/939,287 filed on Feb. 13, 2014. This application is also a continuation-in-part of: U.S. patent application Ser. No. 14/513,863 filed on Oct. 14, 2014, which is a continuation of U.S. patent application Ser. No. 13/668,557, filed on Nov. 5, 2012, now U.S. Pat. No. 8,880,539. The Ser. No. 13/668,557 Application is a continuation of U.S. patent application Ser. No. 12/538,495, filed on Aug. 10, 2009, now U.S. Pat. No. 8,312,031. The Ser. No. 12/538,495 Application is a continuation-in-part of:

(1) U.S. patent application Ser. No. 12/084,150 having a filing date of Apr. 7, 2009, now U.S. Pat. No. 8,655,801, which is the National Stage of International Application No. PCT/IL2006/001235, filed on Oct. 26, 2006, which claims foreign priority from Israeli Application No. 171577 filed on Oct. 26, 2005, and Israeli Application No. 173409 filed on Jan. 29, 2006;

(2) U.S. patent application Ser. No. 12/195,863 filed on Aug. 21, 2008, now U.S. Pat. No. 8,326,775, which claims priority under 35 USC 119 from Israeli Application No. 185414, filed on Aug. 21, 2007, and which is also a continuation-in-part of the above-referenced U.S. patent application Ser. No. 12/084,150; and (3) U.S. patent application Ser. No. 12/348,888, filed Jan. 5, 2009. The Ser. No. 12/348,888 application is a continuation-in-part of the above-referenced U.S. patent application Ser. Nos. 12/084,150 and 12/195,863.

All of the applications and patents referenced above are herein incorporated by reference

TECHNICAL FIELD

The disclosure relates to analysis of multimedia content, and more specifically to generation of signatures to enable matches of three-dimensional multimedia content.

BACKGROUND

With the abundance of multimedia data made available through various means in general and the Internet and world-wide web (WWW) in particular, there is a need for effective ways of searching for, and management of, such multimedia data. Searching, organizing, and management of multimedia data in general, and video data in particular, may be challenging at best due to the difficulty to represent and compare the information embedded in the video content and due to the scale of information that needs to be checked. Moreover, when it is necessary to find a content of video by means of a textual query, existing solutions revert to various metadata that textually describe the content of the multimedia data. However, such content may be abstract and complex by nature and not necessarily adequately defined by the existing and/or attached metadata.

The rapidly increasing number of multimedia databases, accessible, for example, through the Internet, calls for the application of new methods of representation of information embedded in video content. Searching for multimedia in general, and for video data in particular, is challenging due to the huge amount of information that has to be priory indexed, classified, and clustered. Moreover, prior art techniques revert to model-based methods to define and/or describe multimedia data. However, by its very nature, the structure of such multimedia data may be too abstract and/or complex to be adequately represented by means of metadata. The difficulty arises in cases where the target sought for multimedia data is not adequately defined in words, or by respective metadata of the multimedia data. For example, it may be desirable to locate a car of a particular model in a large database of video clips or segments. In some cases the model of the car would be part of the metadata but in many cases it would not. Moreover, the car may be at angles different from the angles of a specific photograph of the car that is available as a search item. Similarly, if a piece of music, as in a sequence of notes, is to be found, it is not necessarily the case that in all available content the notes are known in their metadata form, or for that matter, the search pattern may just be a brief audio clip.

A system implementing a computational architecture (hereinafter "the Architecture") that is based on a PCT patent application publication number WO 2007/049282 and published on May 3, 2007, entitled "A Computing Device, a System and a Method for Parallel Processing of Data Streams", assigned to common assignee, is hereby incorporated by reference for all the useful information it contains. Generally, the Architecture consists of a large ensemble of randomly, independently, generated, heterogeneous processing cores, mapping in parallel data-segments onto a high-dimensional space and generating compact signatures for classes of interest.

A vast amount of multimedia content exists today, whether available on the web or on private networks, having partial or full metadata that describes the content. When new content is added, it is a challenging to provide metadata that is accurate because of the plurality of metadata that may be potentially associated with a multimedia data element. Trying to do so manually is a tedious task and impractical for the amount of multimedia content being generated daily.

Even more challenging is the matching between different multimedia content that represents the same, similar, or related concepts and/or information from different perspectives. For example, an image of the Washington Memorial in Washington, DC, may be taken from different angles, from different distances, in different lighting conditions, and at different positions of the camera, so that while in one photograph the Memorial is diagonal to the picture, it is horizontal in another.

Yet even more challenging is the matching between three-dimensional multimedia content. The third dimension introduces additional variation in the orientation and display of a content item. For example, compared to a two dimensional image, a three-dimensional image may be taken from more angles and in more lighting conditions. Existing solutions which utilize metadata become even less accurate and efficient when processing three-dimensional multimedia content.

It would be therefore advantageous to provide a solution to overcome the limitations of the prior art described hereinabove to more effectively analyze three-dimensional multimedia elements.

SUMMARY

A summary of several exemplary embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments include a method for generating signatures for three-dimensional multimedia data elements. The method comprises receiving a three-dimensional multimedia data element; projecting the received three-dimensional multimedia data element on at least one two-dimensional plane, wherein the projection results in two-dimensional graphic representations of the received three-dimensional multimedia data element; generating at least one signature for each of the plurality of two-dimensional graphic representations; assembling the plurality of signatures generated for each of the plurality of two-dimensional graphic representations to generate a complex signature, wherein the complex signature is the signature representing the three-dimensional multimedia data element; and storing the signatures of each of the two-dimensional graphic representations of the at least one three-dimensional multimedia data element and the complex signature in association with the three-dimensional multimedia data element in a storage unit.

Certain embodiments include a method for comparing between a plurality of three-dimensional multimedia data elements. The method comprises generating a first complex signature for a first three-dimensional multimedia data element; comparing between the first complex signature and a second complex signature for a second three-dimensional multimedia data element; generating a match score respective of the comparison; and determining if a match is found by comparing the match score to a matching threshold.

Certain embodiments include a system for analyzing three-dimensional multimedia data elements. The system comprises a signature generator; an assembler unit; a storage unit; a processing unit; and a memory coupled to the processing unit, the memory contains instructions that when executed by the processing unit cause the system to: receive by the partitioning unit a three-dimensional multimedia data element; project the received three-dimensional multimedia data element on at least one two-dimensional plane, wherein the projection results in two-dimensional graphic representations of the received three-dimensional multimedia data element; generate at least one signature for each of the plurality of two-dimensional graphic representations; assemble by the assembler unit the plurality of signatures generated for each of the plurality of two-dimensional graphic representations to generate a complex signature, wherein the complex signature is the signature representing the three-dimensional multimedia data element; and store the signatures of each of the two-dimensional graphic representations of the at least one three-dimensional multimedia data element and the complex signature in association with the three-dimensional multimedia data element in a storage unit.

Certain embodiments include a system for comparing between a plurality of three-dimensional multimedia data elements. The system comprises a signature generator; a comparison unit; a processing unit; and a memory coupled to the processing unit, the memory contains instructions that when executed by the processing unit cause the system to: generate a first complex signature for a first three-dimensional multimedia data element; compare between the first complex signature and a second complex signature for a second three-dimensional multimedia data element; generate a match score respective of the comparison; and determine if a match is found by comparing the match score to a matching threshold.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
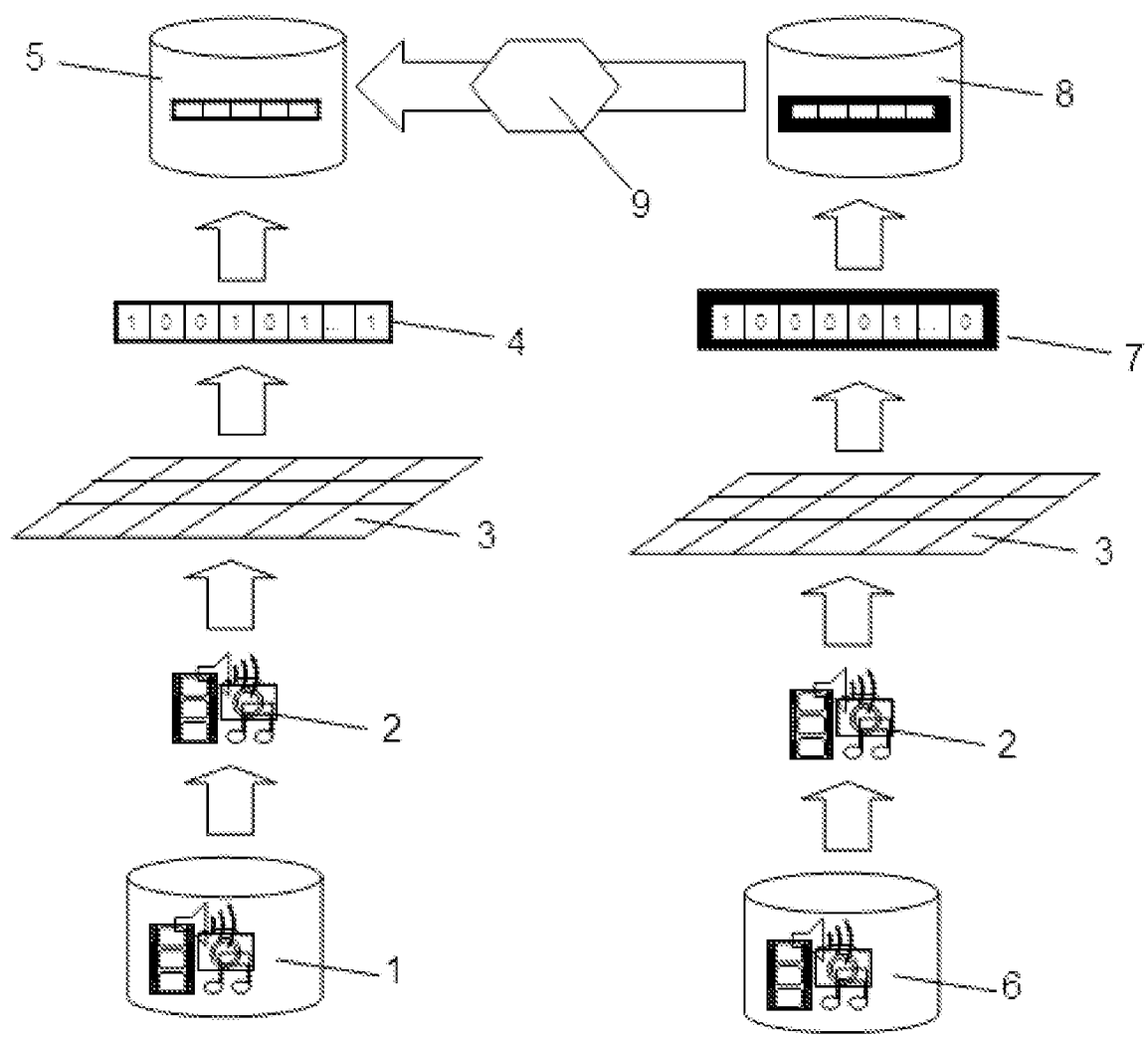
FIG. 1 is a block diagram depicting the basic flow of information in a system in large-scale video matching.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments for generating signatures and comparing signatures for three-dimensional multimedia data elements can utilize a framework, a method, a system, and their technological implementations for large-scale matching-based multimedia Deep Content Classification (DCC)." Such a system is based on the Architecture which is an implementation of a computational architecture described in patent application publication number WO 2007/049282. As mentioned above, the Architecture consists of a large ensemble of randomly and independently generated, heterogeneous processing computational cores, mapping in parallel data-segments onto a high-dimensional space and generating compact signatures for classes of interest.

In one non-limiting implementation, a realization of the Architecture embedded in large-scale video matching system (hereinafter "the Matching System") for multimedia DCC is presented. The Architecture receives an input stream of multimedia content segments, injected in parallel to all computational cores. The computational cores generate compact signatures of a specific content segment, and/or of a certain class of equivalence and interest of content-segments. For large-scale volumes of data, the signatures are stored in a conventional way in a database of size N, allowing a match between the generated signatures of a certain content-segment and the signatures stored in the database, and accomplishing it in a low-cost manner in terms of complexity, i.e. ≤O(logN), and response time.

Characteristics and advantages of the Matching System include, but are not limited to, the Matching System is flat and generates signatures at an extremely high throughput rate; the Matching System generates robust natural signatures, invariant to various distortions of the signal; the Matching System is highly-scalable in high-volume signatures generation; the Matching System is highly scalable in matching against large volumes of signatures; the Matching System generates robust signatures for exact match with low cost, in terms of complexity and response time; the Matching System accuracy is scalable versus the number of computational cores, with no degradation effect on the throughput rate of processing; the throughput of the Matching System is scalable with the number of computational threads, and is scalable with the platform for computational cores implementation, such as FPGA, ASIC, etc.; and, the robust signatures produced by the Matching System are task-independent, thus the process of classification, recognition and clustering can be done independently from the process of signatures generation, in the superior space of the generated signatures.

The goal of the Matching System is to effectively find matches between members of a large scale Master Database (DB) of video content-segments and a large scale Target DB of video content-segments. The match between two video content segments should be invariant to a certain set of statistical distortions performed independently on two relevant content-segments. Moreover, the process of matching between a certain content-segment from the Master DB to the Target DB consisting of N segments cannot be done by matching directly the Master content-segment to all N Target content-segments, for large-scale N, since the corresponding complexity of O(N), will lead to non-practical response time. Thus, the representation of content-segments by both Robust Signatures and Signatures is crucial application-wise. The Matching System embodies a specific realization of the Architecture for large scale video matching purposes.

A high-level description of the process for large scale video matching performed by the Matching System is depicted in FIG. 1. Video content segments 2 from a Master DB 6 and a Target DB 1 are processed in parallel by a large number of independent computational cores 3 that constitute the Architecture. Further details on the computational cores generation are provided below. The independent cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 2. Referring back to FIG. 1 where, at the final step, Target Robust Signatures and/or Signatures are effectively matched, by a matching algorithm 9, to Master Robust Signatures and/or Signatures database to find all matches between the two databases.

To demonstrate an example of signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames and the information of the frame's patches.

Figure 2:
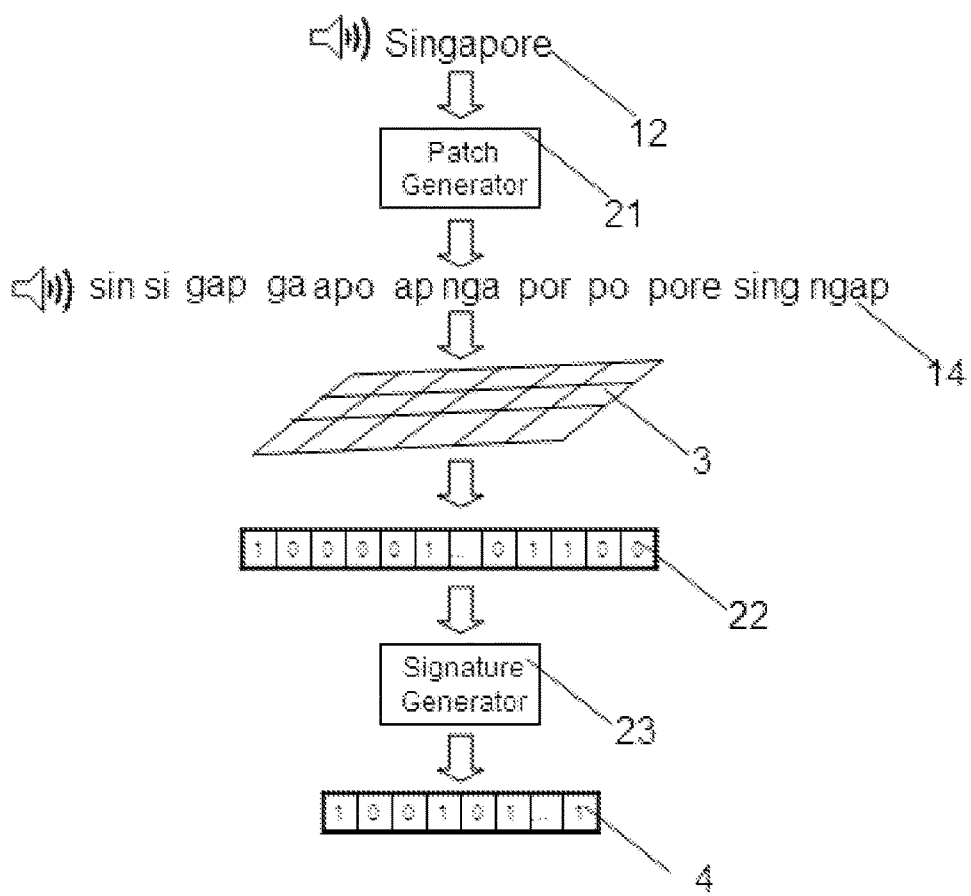
FIG. 2 is a diagram showing the flow of patches generation, response vector generation, and signature generation in a large-scale speech-to-text system.

The signatures generation process will be described with reference to FIG. 2. The first step in the process of signatures generation from a given speech-segment is to break-down the speech-segment to K patches 14 of random length P and random position within the speech segment 12. The breakdown is performed by the patch generator component 21. The value of K and the other two parameters are determined based on optimization, considering the tradeoff between accuracy rate and the number of fast matches required in the flow process of the System. In the next step, all the K patches are injected in parallel to all L computational Cores 3 to generate K response vectors 22. The vectors 22 are fed into the signature generator 23 to produce a Signatures and Robust Signatures 4.

In order to generate Robust Signatures, i.e., Signatures that are robust to additive noise L (where L is an integer equal to or greater than 1) computational cores are utilized in the Matching System. A frame 'i' is injected into all the cores. The cores generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i=\{n_i\}$ (1≤i≤L) may consist of a single leaky integrate-to-threshold unit (LTU) node or more nodes. The node $n_i$ equations are:

$$V_i = \sum_j w_{ij} k_j$$

$n_i = \theta(V_i - Th_s)$; $\theta$ is a Heaviside step function; $w_{ij}$ is a coupling node unit (CNU) between node i and image component j (for example, grayscale value of a certain pixel j); $k_j$ is an image component j (for example, grayscale value of a certain pixel j); $Th_x$ is a constant Threshold value, where x is 'S' for Signature and 'RS' for Robust Signature; and $V_i$ is a Coupling Node Value.

The Threshold values $Th_x$ are set differently for Signature generation and for Robust Signature generation. For example, for a certain distribution of $V_i$ values (for the set of nodes), the thresholds for Signature ($Th_S$) and Robust Signature ($Th_{RS}$) are set apart, after optimization, according to at least one or more of the following criteria:
I:

For: $V_i > Th_{RS}$ b $1-p(V>Th_S) = 1-(1-\epsilon)^l \ll 1$ i.e., given that I nodes (cores) constitute a Robust Signature of a certain image I, the probability that not all of these I nodes will belong to the Signature of same, but noisy image, $\tilde{I}$ is sufficiently low (according to a system's specified accuracy).
II:

$p(V_i > Th_{RS}) \approx l/L$ i.e., approximately I out of the total L nodes can be found to generate Robust Signature according to the above definition.
III: Both Robust Signature and Signature are generated for certain frame i.

It should be understood that the creation of a signature is a unidirectional compression where the characteristics of the compressed data are maintained but the compressed data cannot be reconstructed. Therefore, a signature can be used for the purpose of comparison to another signature without the need of comparison of the original data. A detailed description of the signature generation process can be found in the co-pending patent applications of which this patent application is a continuation-in-part of, and are hereby incorporated by reference.

Computational Core generation is a process of definition, selection, and tuning of the Architecture parameters for a certain realization in a specific system and application. The process is based on several design considerations, such as:

(a) The cores should be designed so as to obtain maximal independence, i.e. the projection from a signal space should generate a maximal pair-wise distance between any two cores' projections into a high-dimensional space.

(b) The cores should be optimally designed for the type of signals, i.e. the cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to set of signal distortions, of interest in relevant application.

A system and method for generating complex signatures for a multimedia data element (MMDE) based on signatures of minimum size multimedia data elements are now discussed. Accordingly partitions the multimedia data content to minimum size multimedia data elements and selects a reduced set of MMDEs based on generic low-level characteristics of MMDEs. A signature generator is configured to generate signatures for each of the selected minimum size multimedia data elements. An assembler unit is configured to assemble a complex signature for a higher level partition multimedia data element by assembling at least one respective complex signature of minimum size multimedia data elements of an immediately lower partition level. Multimedia data elements include, but are not limited to, images, graphics, video streams, video clips, audio streams, audio clips, video frames, photographs, images of signals, combinations thereof, and portions thereof. This process generates hologram-like relationship within the complex-signature set of signatures, i.e., each signature contains some information of the complete set of multimedia data elements). While the original signature represents some local information about relevant multimedia data elements, the complex signature structure enables distributed representation of the information of the entire set of multimedia data elements.

Figure 3:
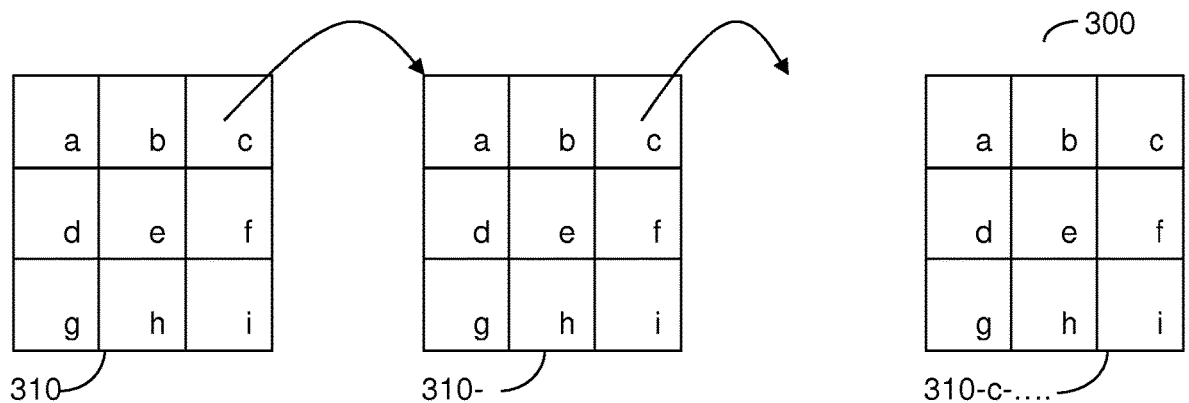
FIG. 3 is a diagram illustrating the generation of complex signatures.

Complex signatures, for example, but without limitations, signatures as described hereinabove, are generated for the multimedia data elements. FIG. 3 shows an exemplary and non-limiting diagram illustrating the generation of such complex signatures. For the purpose of the discussion, but by no means of limitation or loss of generality, an image 310 is partitioned into a plurality of portions 310-*a* through 310-*i*. An element 310-*c* may then be further partitioned to elements 310-*c-a*, 310-*c-b*, . . . , 310-*c-i*. This of course may continue until an element 310-*c-c*- . . . -*c* is determined to be sufficiently small, for example by determining a threshold after which no additional partition takes place. It should be noted that though in the description hereinabove each portion was divided into the same number of sub-portions as the other portion, specifically the higher level portion, this is not required in order to achieve the benefits of the disclosed embodiments. In fact, the number of sub-portions may differ from this example and may further differ at each stage or portion. For each of these minimum size multimedia data elements a signature is then generated. The signatures may be generated based on the principles discussed hereinabove, however, other techniques for generating such signatures may be used without departing from the scope of the disclosed embodiments.

A complex signature is a signature which is a combination of lower level signatures. In an embodiment, the signature of the multimedia element 310 is therefore the following combination: $S_{310}=\{S_{310\text{-}a}, S_{310\text{-}b}, \ldots S_{310\text{-}i}\}$. Each of the signatures $S_{310\text{-}a}$ through $S_{310\text{-}i}$ is also a complex signature of lower level signatures, for example, the signature $S_{310\text{-}c}$ is a complex signature that is a combination of: $S_{310\text{-}c}=\{S_{310\text{-}c\text{-}a}, S_{310\text{-}c\text{-}b}, \ldots S_{310\text{-}c\text{-}i}\}$. As explained above, this may continue such that a signature $S_{310\text{-}c\text{-}b}$ may be a complex signature of lower level signatures.

In one implementation, at least lowest level multimedia data elements have signatures respective of at least for angular permutations of the element, i.e., rotated by 0°, rotated by 90°, rotated by 180°, and rotated by 270°. While degrees of permutations where shown herein, other permutations may be used depending on the type of the multimedia data element. The rationale for having such image permutation is to enable a better matching between multimedia data elements. The matching process is explained in detail herein below.

Figure 4:
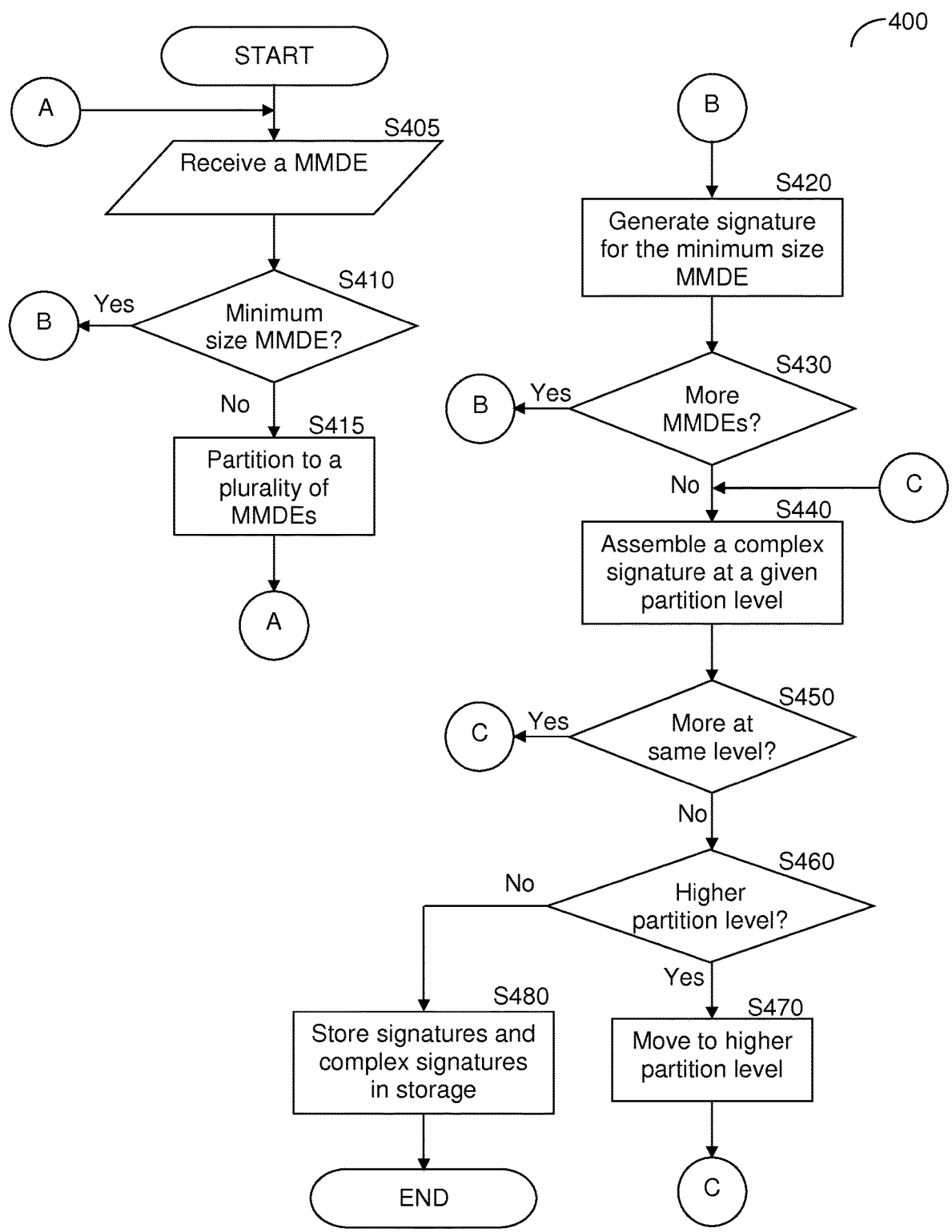
FIG. 4 is a flowchart illustrating a method of generation of complex signatures.

FIG. 4 shows an exemplary and non-limiting flowchart 400 illustrating the method of generation of a complex signature. In S405, a multimedia data element is received, for example, from storage of a system. In S410, it is checked if the multimedia data element is of a minimum size, and if so execution continues with S420; otherwise, execution continues with S415 where the received multimedia data element is partitioned to smaller multimedia data elements, the smaller partitions, for example, stored in the storage, and execution continues with S405.

In S420, a signature is generated for the minimum size multimedia data element of the received multimedia data element, and the portions thereof. The signature may be generated as explained hereinabove and/or by other signature generation means that provide a signature respective of the multimedia data element. In S430, it is checked whether additional multimedia data elements are present, and if so execution continues with S420; otherwise, execution continues with S440.

In S440, complex signatures are assembled for each multimedia data element of a particular partition level, each complex signature comprising a plurality of signatures of lower partition level signatures, as shown with respect to FIG. 3 above. In S450, it is checked if there are more multimedia elements at the same higher partition level and if so execution continues with S440; otherwise execution continues with S460. In S460, it is checked if there are multimedia data elements of a higher partition level. If so, execution continues with S470 where a higher partition level is sought and then execution continues with S440; otherwise execution continues with S480. In S480, the generated and assembled signatures are all stored in a storage unit, for example, the storage of The System.

Figure 5:
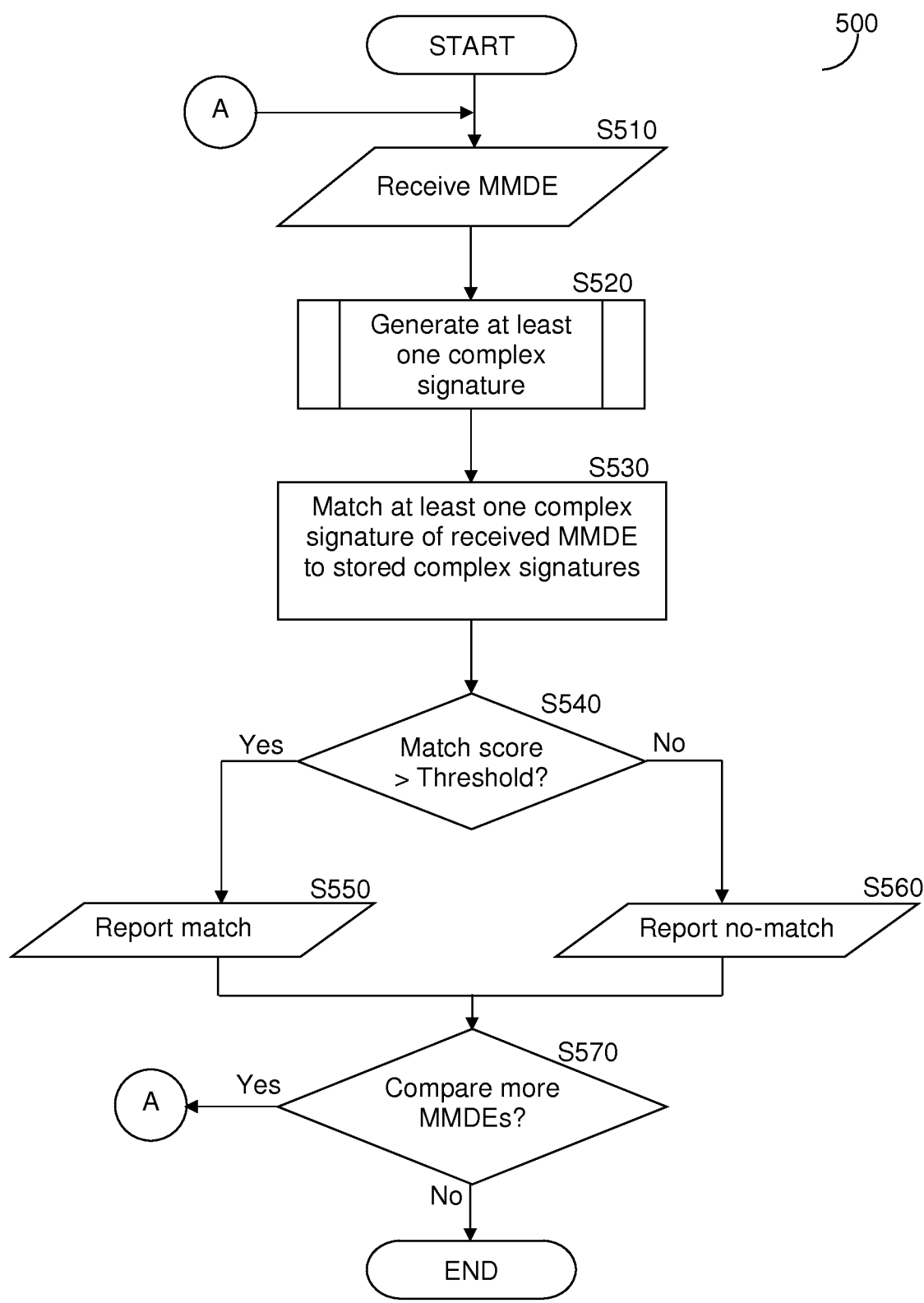
FIG. 5 is a flowchart illustrating a method of matching multimedia data elements based on complex signatures.

FIG. 5 shows an exemplary and non-limiting flowchart 500 illustrating the method for matching multimedia data elements based on complex signatures. In S510, a multimedia data element is received, for example, by a system that is enabled to perform matching of signatures such as the system 600, and enabled for the creation of complex signatures as explained hereinabove in greater detail. In S520, at least one complex signature is generated for the received multimedia data element, performed, for example, in accordance with the principles discussed with reference to FIGS. 3 and 4 above.

In S530, the complex signature of the received multimedia data element is matched with complex signatures stored in storage, for example in the storage of The System. S530 comprises matching of all the signatures generated for the minimum size multimedia data elements. In S540, it is checked if a match score generated based on the complex signatures is over a predefined matching threshold, and if so execution continues with S550; otherwise, execution continues with S560. In S550, a report of a match found is generated. In S560, a report of no-match found is generated.

In S570, it is checked whether additional multimedia data elements are to be compared, and if so execution returns to S510; otherwise, execution terminates. It should be noted that the matching at the lowest level may include matching against a plurality of permutations of the minimum size multimedia data element, thereby increasing the chance for correct matching between two multimedia data elements. The method 500 may be employed using complex signatures, non-complex signatures, or a combination thereof.

Figure 6:
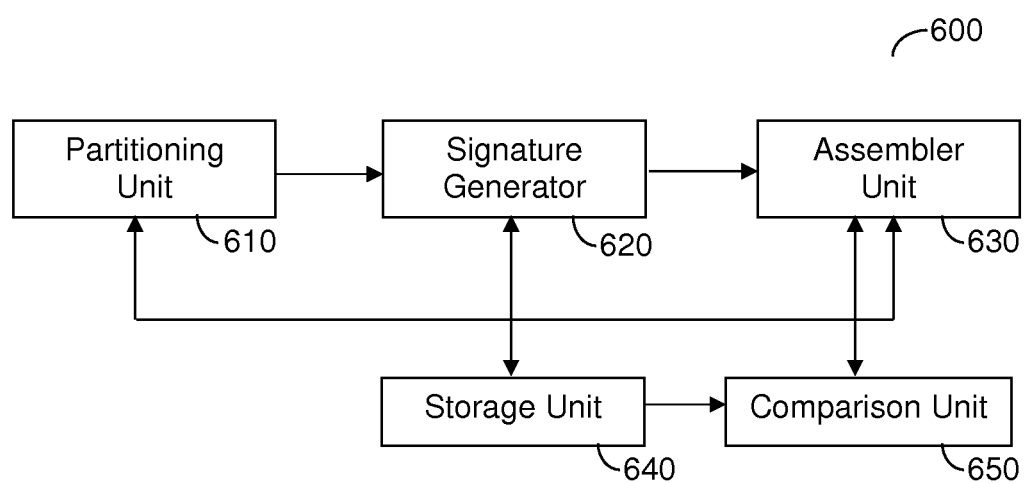
FIG. 6 is a block diagram of a system for generating complex signatures.

A complex signature may be generated by an exemplary and non-limiting system 600 depicted in FIG. 6. The system 600 includes a partitioning unit 610 configured to receive a multimedia data element and partitions the multimedia data element to small multimedia data elements. At each level of partitioning, the sizes of the partitioned multimedia data elements are checked and, if the partitioned multimedia data element is above a predetermined size threshold, the partitioning process continues until a level of partitioning is reached where minimum size multimedia data elements are generated. The signature generator 620, coupled to the partitioning unit 610 either directly or via a storage unit 640, is configured to generate a signature for each minimum size multimedia data element.

In one embodiment, the signature is generated in accordance with signature generation principles explained in more detail herein above. The assembler unit 630, coupled to the signature generator 620 either directly or via the storage unit 640, is configured to generate complex signatures for each level of partitioning starting from one level above the level of the signatures of the minimum size multimedia data elements. At this level, the complex signature of a partitioned multimedia data element comprises a plurality of signatures generated for the minimum size multimedia data elements. At levels higher than that level, the signature of the partitioned multimedia data element, or for that effect, the multimedia data element received by the partitioning unit 610, comprises a plurality of complex signatures assembled from complex signature of the immediately lower partitioning level. The complex signature and the signatures of the minimum size multimedia elements may be stored in the storage unit 640.

In accordance with another embodiment, the system 600 can be utilized to compare input multimedia data elements to stored multimedia data elements. In this embodiment, a comparison unit 650, connected to the storage unit 640 and the assembler unit 630, is configured to compare the signatures comprising the complex signature of an input multimedia data element to the signatures of at least one stored multimedia data element. The comparison unit 650 further generates a match indication when a match between the input multimedia data element and the stored multimedia data element is found.

Figure 7:
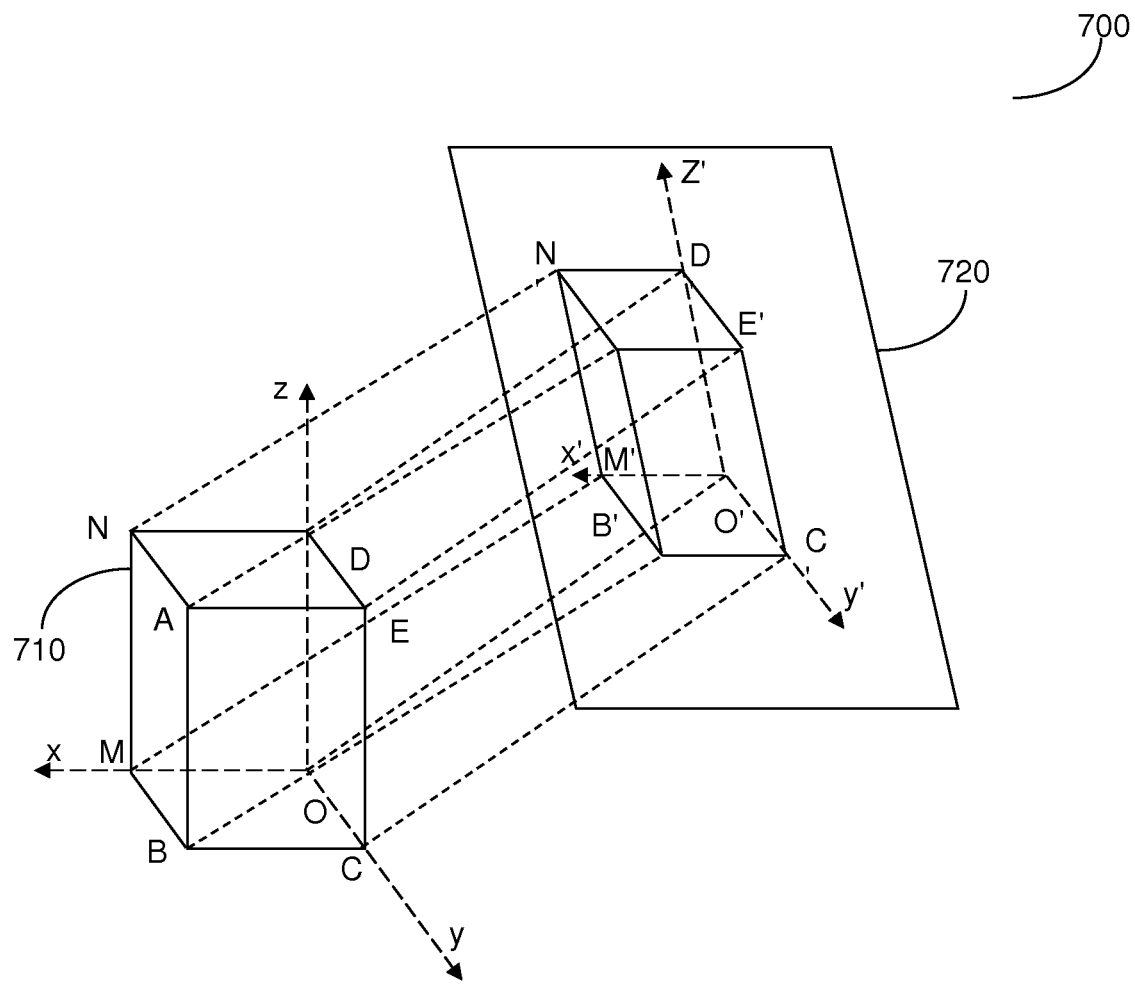
FIG. 7 is a block diagram of a system for analyzing a three-dimensional multimedia element in accordance with an embodiment.

According to certain embodiments disclosed herein, the process for generating signatures and/or complex signatures can be utilized to produce signatures for three-dimensional multimedia elements (hereinafter "3D-MMDEs"). The generation of such signatures is based on the projection of a 3D-MMDE to a two-dimensional plane. An exemplary embodiment for such projection is illustrated in FIG. 7. Such a projection may be performed, for example and without limitation, by the system 600 for generating signatures discussed in detail with respect to FIG. 6.

As shown in FIG. 7, a 3D-MMDE 710 having a cube shape is received by the system 600. The 3D-MMDE 710 may be, for example, a three-dimensional image, a three-dimensional graphics, a three-dimensional video stream, a three-dimensional video clip, a three-dimensional video frame, a three-dimensional photograph, a combination thereof, and portions thereof.

In an embodiment, the system 600 is configured to identify the 3D-MMDE 710 comprises 8 edges: A, B, C, D, M, N, O, and K. The 3D-MMDE 710 is then projected on a two-dimensional plane surface 720 having three axes: x, y, and z. A plurality of plane surfaces may be employed. Respective of the projection, each edge of the 3D-MMDE 710 illustrating a cube 710 A, B, C, D, M, N, O, and K receives a graphic representation on the plane (two-dimensional) surface 720: A', B', C', D', E', M', N', O', and K' respectively.

The graphic representations projected on surface 720 are then analyzed by the system 600. Specifically, at least one signature is generated for each edge of the object presented in the 3D-MMDE 710. The signatures are then stored in the storage unit 640 for further use. According to one embodiment, the generated signatures are assembled to at least one complex signature. The complex signature can also be stored in the storage unit 640 for further use.

Figure 8:
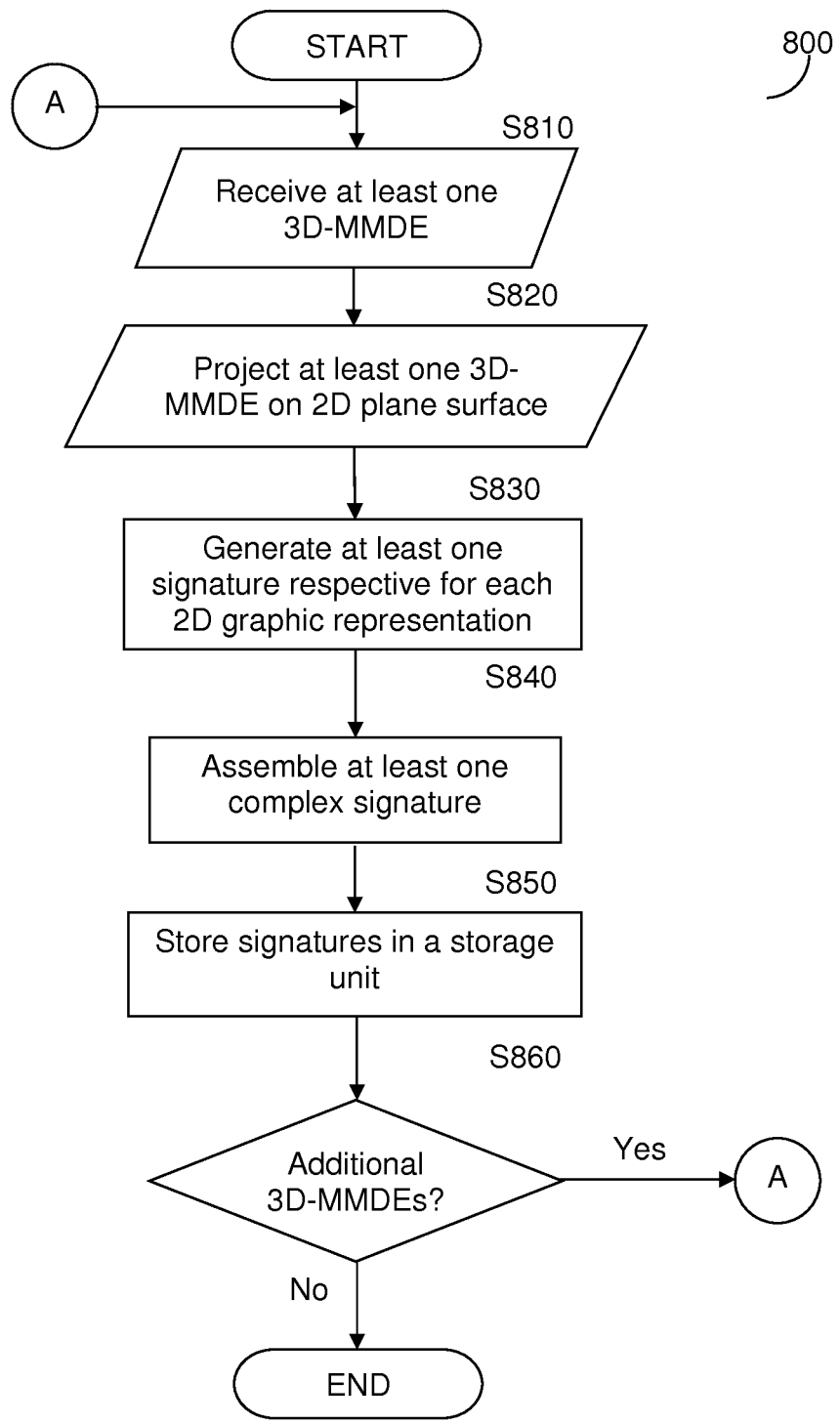
FIG. 8 is a flowchart illustrating a system for analyzing a three-dimensional multimedia element in accordance with an embodiment.

FIG. 8 is an exemplary and non-limiting flowchart 800 of a method for generating signatures to a 3D-MMDE in accordance with an embodiment. In S810, at least one 3D-MMDE is received. In S820, the at least one 3D-MMDE is projected on a 2D plane surface, thereby 2D-graphic representations of the at least one 3D-MMDE are received. In S830, for each 2D-graphic representation resulted from the projection of the 3D-MMDE, at least one signature is generated. The at least one signature may be a robust signature. In an embodiment, the signature for each 2D-graphic representation is generated using the process discussed in detail above. Thus, S830 results with a collection of signatures for the 2D-graphic representations yielded from the projection of the 2D-graphic representation.

In S840, at least one complex signature is assembled using the signatures generated in S830. A complex signature is a signature which is a combination of lower level signatures. In an embodiment, the at least one complex signature is assembled according to the method as described in further detail hereinabove with respect to FIG. 4. The generated complex signature represents the signature of the 3D-MMDE.

In S850, the signatures of each of the two-dimensional graphic representations of the at least one three-dimensional MMDE and the at least one complex signature in association with the 3D-MMDE are stored in a storage unit. In S860, it is checked whether there are additional 3D-MMDEs to analyze and if so, execution continues with S810; otherwise, execution terminates.

In exemplary embodiments, the complex signatures generated by the method 800 may be utilized for matching between 3D-MMDEs. The matching of 3D-MMDEs using complex signatures may be performed using the method disclosed in detail above.

The disclosed embodiments may be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A non-transitory computer readable medium having stored thereon instructions for causing a processing unit to execute the steps of:
   generating a multiple-levels representation of an image, wherein each level representation is obtained by segmenting portions of a higher level representation;
   calculating for each portion of a lowest-level representation of the multiple-levels representation, at least one lowest-level signature to provide multiple lowest-level signatures related to multiple portions of the lowest-level representations;
   calculating a complex signature for each other-than-lowest-level portion to provide multiple complex signatures for the other-than-lowest-level portions, the complex signature is a combination of lowest-level signatures related to lowest-level portions that belong to the other-than-lowest-level portion; wherein the other-than-lowest-level portion belongs to a level representation that differs from the lowest-level representation; and storing, in a storage unit, the complex signatures and the multiple lowest-level signatures;
   wherein the multiple-levels representation of each of the plurality of two-dimensional graphic representations comprises a lowest-level representation, a first other-than-lowest-level representation and a second other-than-lowest level representation; wherein the second other-than-lowest-level representation is obtained by segmenting portions of the first other-than-lowest level representation; wherein the first other-than-lowest level representation is obtained by segmenting the lowest-level representation.

2. The method of claim 1, comprising generating a multiple-levels representation of each of the plurality of two-dimensional graphic representations, wherein each level representation is obtained by segmenting portions of a higher level representation;
   wherein the generating of the at least one signature for each of the plurality of two-dimensional graphic representations comprises:
   calculating, by a processing unit and for each portion of a lowest-level representation of the multiple-levels representation, at least one lowest-level signature to provide multiple lowest-level signatures related to multiple portions of the lowest-level representations;
   calculating a complex signature for each other-than-lowest-level portion to provide multiple complex signatures for the other-than-lowest-level portions, the complex signature is a combination of lowest-level signatures related to lowest-level portions that belong to the other-than-lowest-level portion; wherein the other-than-lowest-level portion belongs to a level representation that differs from the lowest-level representation; and
   storing, in a storage unit, the complex signatures and the multiple lowest-level signatures.

3. The method of claim 2, wherein a lowest-level representation of the multiple-levels representation, multiple lowest-level signatures respective to multiple angular permutations.

4. The method of claim 3 wherein the multiple portions of the lowest-level representations are projections of edges of the three-dimensional multimedia data element.

5. The method of claim 2, wherein each portion of the lowest-level representation is of a predefined minimal size.

6. The method according to claim 2 wherein the multiple-levels representation of each of the plurality of two-dimensional graphic representations comprises a lowest-level representation, a first other-than-lowest-level representation and a second other-than-lowest level representation; wherein the second other-than-lowest-level representation is obtained by segmenting portions of the first other-than-lowest level representation; wherein the first other-than-lowest level representation is obtained by segmenting the lowest-level representation.

7. The method according to claim 6 comprising calculating a complex signature for each first other-than-lowest-level representation portion and calculating a complex signature for each second other-than-lowest-level representation portion; wherein a complex signature of each second other-than-lowest level representation portion is a combination of lowest-level signatures related to lowest-level portions that belong to each one of the first other-than-lowest-level portions that belong to the second other-than-lowest level representation portion.

8. The method of claim 1, further comprising: matching the three-dimensional multimedia data element with at least one additional three-dimensional multimedia data element stored in the storage unit.

9. The method of claim 8, wherein matching the signatures further comprising: comparing between the complex signature of the three-dimensional multimedia data element and a complex signature generated for the at least one additional three-dimensional multimedia data element; generating a match score respective of the comparison; determining if a match is found by comparing the match score to a matching threshold, and if a match is found generating a match indication; otherwise, generating a no-match indication.

10. The method of claim 9, wherein comparing between the complex signatures is performed by a plurality of computational cores responsive of at least complex signatures stored in the storage unit.

11. The method according to claim 1, wherein the processing unit comprises independent computational cores.

12. The method according to claim 11 wherein each of said independent computational cores comprising properties having at least some statistical independency from other of said computational cores, said properties being set independently of each other of said computational cores.

13. A non-transitory computer readable medium having stored thereon instructions for causing a processing unit to execute the steps of:
  generating a multiple-levels representation of an image, wherein each level representation is obtained by segmenting portions of a higher level representation;
  calculating for each portion of a lowest-level representation of the multiple-levels representation, at least one lowest-level signature to provide multiple lowest-level signatures related to multiple portions of the lowest-level representations;
  calculating a complex signature for each other-than-lowest-level portion to provide multiple complex signatures for the other-than-lowest-level portions, the complex signature is a combination of lowest-level signatures related to lowest-level portions that belong to the other-than-lowest-level portion; wherein the other-than-lowest-level portion belongs to a level representation that differs from the lowest-level representation; and
  storing, in a storage unit, the complex signatures and the multiple lowest-level signatures.

14. The method according to claim 13 comprising calculating a complex signature for each first other-than-lowest-level representation portion and calculating a complex signature for each second other-than-lowest-level representation portion; wherein a complex signature of each second other-than-lowest level representation portion is a combination of lowest-level signatures related to lowest-level portions that belong to each one of the first other-than-lowest-level portions that belong to the second other-than-lowest level representation portion.

15. A method for comparing between a plurality of three-dimensional multimedia data elements, comprising: generating a first complex signature for a first three-dimensional multimedia data element; comparing between the first complex signature and a second complex signature for a second three-dimensional multimedia data element; generating a match score respective of the comparison; and determining if a match is found by comparing the match score to a matching threshold; wherein for each one of the first and second three-dimensional multimedia data element the method comprises generating at least three hierarchical layers of representation related to the three-dimensional multimedia data element, wherein the at least three hierarchical layers of representation comprise a lowest level of representation; wherein for each one of the first and second three-dimensional multimedia data element the complex signature is a combination of lowest level signatures of portions of the lowest level of representation.

16. The method of claim 15, further comprising: generating a match indication if a match is found; otherwise, generating a no-match indication.

17. The method of claim 15, wherein generating a complex signature for a three-dimensional multimedia data element further comprises: projecting the three-dimensional multimedia data element on at least one two-dimensional plane, wherein the projection results in two-dimensional graphic representations of the received three-dimensional multimedia data element; generating at least one signature for each of the plurality of two-dimensional graphic representations; assembling the plurality of signatures generated for each of the plurality of two-dimensional graphic representations to generate the complex signature, wherein the complex signature is the signature representing the three-dimensional multimedia data element; and storing the signatures of each of the two-dimensional graphic representations of the at least one three-dimensional multimedia data element and the complex signature in association with the three-dimensional multimedia data element in a storage unit.

18. The method of claim 15, wherein comparing between the complex signatures is performed by a plurality of computational cores responsive of at least complex signatures stored in the storage unit.

19. A non-transitory computer readable medium having stored thereon instructions for causing a processing unit to execute the steps of:
  generating a first complex signature for a first image; comparing between the first complex signature and a second complex signature for a second image; generating a match score respective of the comparison; and determining if a match is found by comparing the match score to a matching threshold;
  wherein the first complex signature is calculated by:
  generating a multiple-levels representation of the first image, wherein each level representation is obtained by segmenting portions of a higher level representation;
  calculating, by leaky integrate-to-threshold, for each portion of a lowest-level representation of the multiple-levels representation, at least one lowest-level signature to provide multiple lowest-level signatures related to multiple portions of the lowest-level representations; and
  calculating a complex signature for each other-than-lowest-level portion to provide multiple complex signatures for the other-than-lowest-level portions, the complex signature is a combination of lowest-level signatures related to lowest-level portions that belong to the other-than-lowest-level portion; wherein the other-than-lowest-level portion belongs to a level representation that differs from the lowest-level representation.

20. The non-transitory computer readable medium according to claim 19 wherein the multiple-levels representation of each of the plurality of two-dimensional graphic representations comprises a lowest-level representation, a first other-than-lowest-level representation and a second other-than-lowest level representation; wherein the second other-than-lowest-level representation is obtained by segmenting portions of the first other-than-lowest level representation; wherein the first other-than-lowest level representation is obtained by segmenting the lowest-level representation.

21. The non-transitory computer readable medium according to claim 19 that further stores thereon instructions for causing the processing unit to execute the steps of calculating a complex signature for each first other-than-lowest-level representation portion and calculating a complex signature for each second other-than-lowest-level representation portion; wherein a complex signature of each second other-than-lowest level representation portion is a combination of lowest-level signatures related to lowest-level portions that belong to each one of the first other-than-lowest-level portions that belong to the second other-than-lowest level representation portion.

22. A system for analyzing three-dimensional multimedia data elements, comprising: a processing unit that comprises independent computational cores, each computational core having properties set to be independent of each other computational core; and a memory coupled to the processing unit, the memory contains instructions that when executed by the processing unit cause the system to: receive a three-dimensional multimedia data element; project the received three-dimensional multimedia data element on at least one two-dimensional plane, wherein the projection results in two-dimensional graphic representations of the received three-dimensional multimedia data element; generate at least one signature for each of the plurality of two-dimensional graphic representations; assemble the plurality of signatures generated for each of the plurality of two-dimensional graphic representations to generate a complex signature, wherein the complex signature is the signature representing the three-dimensional multimedia data element; and store the signatures of each of the two-dimensional graphic representations of the at least one three-dimensional multimedia data element and the complex signature in association with the three-dimensional multimedia data element in a storage unit.

23. The system of claim 22, wherein the three-dimensional multimedia data element is at least one of: a three-dimensional image, a three-dimensional graphics, a three-dimensional video stream, a three-dimensional video clip, a three-dimensional video frame, a three-dimensional photograph, and portions thereof.

24. The system of claim 22, wherein the system is further configured to: generate a first signature and a second signature, wherein the first signature is a robust signature.

25. The system of claim 22, wherein the complex signature is a signature which is a combination of lower level signatures.

26. The system of claim 25, wherein a complex signature of a higher partition level comprises a plurality of complex signatures of a lower partition level or signatures of a plurality of the minimum size multimedia data elements.

27. The system of claim 26, wherein the system is further configured to: compare between the complex signature generated for the received three-dimensional multimedia data element and a complex signature generated for the at least one additional three-dimensional multimedia data element; generate a match score respective of the comparison; determine if a match is found by comparing the match score to a matching threshold, and if a match is found generating a match indication; otherwise, generating a no-match indication.

28. The system of claim 27, wherein the processing unit comprises: the plurality of computational cores, each computational core having properties set to be independent of each other computational core, each computational core generates responsive to the three-dimensional multimedia data element the signature comprising of a first signature element and a second signature element, said first signature element being a robust signature.

29. The system of claim 22, wherein the system is further configured to: match the received three-dimensional multimedia data element with at least one additional three-dimensional multimedia data element stored in the storage unit.

30. The system according to claim 22 wherein the processing unit is system is configured to generate the at least one signature for each of the plurality of two-dimensional graphic representations by generating a multiple-levels representation of each of the plurality of two-dimensional graphic representations, wherein each level representation is obtained by segmenting portions of a higher level representation; wherein a generating of the at least one signature for each of the plurality of two-dimensional graphic representations comprises calculating, by the processing unit and for each portion of a lowest-level representation of the multiple-levels representation, at least one lowest-level signature to provide multiple lowest-level signatures related to multiple portions of the lowest-level representations; and wherein the processing unit is configured to assemble a complex signature for each other-than-lowest-level portion to provide multiple complex signatures for the other-than-lowest-level portions, the complex signature is a combination of lowest-level signatures related to lowest-level portions that belong to the other-than-lowest-level portion; wherein the other-than-lowest-level portion belongs to a level representation that differs from the lowest-level representation.

31. The system according to claim 30 wherein the multiple-levels representation of each of the plurality of two-dimensional graphic representations comprises a lowest-level representation, a first other-than-lowest-level representation and a second other-than-lowest level representation; wherein the second other-than-lowest-level representation is obtained by segmenting portions of the first other-than-lowest level representation; wherein the first other-than-lowest level representation is obtained by segmenting the lowest-level representation.

32. The system according to claim 31 wherein the processing unit is configured to execute the steps of calculating a complex signature for each first other-than-lowest-level representation portion and calculating a complex signature for each second other-than-lowest-level representation portion; wherein a complex signature of each second other-than-lowest level representation portion is a combination of lowest-level signatures related to lowest-level portions that belong to each one of the first other-than-lowest-level portions that belong to the second other-than-lowest level representation portion.

33. A system for comparing between a plurality of three-dimensional multimedia data elements, comprising: a processing unit; and a memory coupled to the processing unit, the memory contains instructions that when executed by the processing unit cause the system to: generate a first complex signature for a first three-dimensional multimedia data element; compare between the first complex signature and a second complex signature for a second three-dimensional multimedia data element; generate a match score respective of the comparison; and determine if a match is found by comparing the match score to a matching threshold; wherein for each one of the first and second three-dimensional multimedia data element the system is configured to generate at least three hierarchical layers of representation related to the three-dimensional multimedia data element, wherein the at least three hierarchical layers of representation comprise a lowest level of representation; wherein for each one of the first and second three-dimensional multimedia data element the complex signature is a combination of lowest level signatures of portions of the lowest level of representation.

34. The system of claim 33, the system is further configured to: generate a match indication if a match is found; otherwise, generating a no-match indication.

35. The system of claim 33, wherein the system is further configured to: project the three-dimensional multimedia data element on at least one two-dimensional plane, wherein the projection results in two-dimensional graphic representations of the received three-dimensional multimedia data element; wherein the at least three hierarchical layers of representation related to the three-dimensional multimedia data element are at least three hierarchical layers of representation of the two-dimensional graphic representations.

\* \* \* \* \*